US012296899B2

(12) United States Patent
Johnson et al.

(10) Patent No.: US 12,296,899 B2
(45) Date of Patent: May 13, 2025

(54) STEERING SYSTEM

(71) Applicant: Nivel Parts & Manufacturing Co., LLC, Jacksonville, FL (US)

(72) Inventors: Jesse Johnson, Shreveport, LA (US); Joseph Anastacio Higuera, West Monroe, LA (US)

(73) Assignee: Nivel Parts & Manufacturing Co., LLC, Jacksonville, FL (US)

( * ) Notice: Subject to any disclaimer, the term of this patent is extended or adjusted under 35 U.S.C. 154(b) by 636 days.

(21) Appl. No.: 17/711,116

(22) Filed: Apr. 1, 2022

(65) Prior Publication Data

US 2022/0315101 A1 Oct. 6, 2022

Related U.S. Application Data

(60) Provisional application No. 63/170,408, filed on Apr. 2, 2021.

(51) Int. Cl.
*B62D 5/12* (2006.01)
*B62D 5/08* (2006.01)
*B62D 7/16* (2006.01)

(52) U.S. Cl.
CPC ............... *B62D 5/12* (2013.01); *B62D 5/08* (2013.01); *B62D 7/163* (2013.01)

(58) Field of Classification Search
CPC ... B62D 5/08; B62D 5/12; B62D 5/22; B62D 7/163; B62D 7/226
USPC ........................................................ 180/439
See application file for complete search history.

(56) References Cited

U.S. PATENT DOCUMENTS

| 7,077,234 | B2 | 7/2006 | Klais |
| 7,121,377 | B2 * | 10/2006 | Klais .......................... B62D 5/12 180/428 |
| 7,942,230 | B2 | 5/2011 | Kogel |
| 8,201,656 | B2 | 6/2012 | Archer |
| 9,193,377 | B2 | 11/2015 | Pavuk |
| 9,283,985 | B2 | 3/2016 | Schroeder |
| 9,783,224 | B1 | 10/2017 | Roberts |

(Continued)

FOREIGN PATENT DOCUMENTS

GB 1234482 A * 6/1971 ............... B62D 5/22

OTHER PUBLICATIONS

"Compact Hydraulic Cylinders", Parker Hannifin Corporation, Catalog HY08-M1137-7/NA, Jun. 2022.

*Primary Examiner* — James A English
*Assistant Examiner* — Felicia L. Brittman-Alabi
(74) *Attorney, Agent, or Firm* — Barnes & Thornburg LLP

(57) ABSTRACT

A steering system includes a steering control, a steering assist assembly, and two anti-rotation arms. The steering assist assembly includes a housing includes two hollow cylinders formed therein. A piston is slidably arranged within the first cylinder and an axial rod is slidably arranged within the second cylinder. First and second tie rods are connected to first and second axial ends of the axial rod. A shaft operably connected to the steering control is configured to engage with the axial rod such that rotation of the shaft causes axial movement of the axial rod. The axial movement of the axial rod causes axial movement of the first and second tie rods so as to turn the wheels of the vehicle. The anti-rotation arms are operably connected to the piston and to the axial rod and are configured to prevent rotation of the piston and the axial rod.

20 Claims, 18 Drawing Sheets

(56) References Cited

U.S. PATENT DOCUMENTS

| | | | |
|---|---|---|---|
| 10,442,458 B2 | 10/2019 | Heon | |
| 2006/0231323 A1 | 10/2006 | Rosenfeld | |
| 2015/0060186 A1* | 3/2015 | Pavuk | B62D 3/12 |
| | | | 180/400 |

* cited by examiner

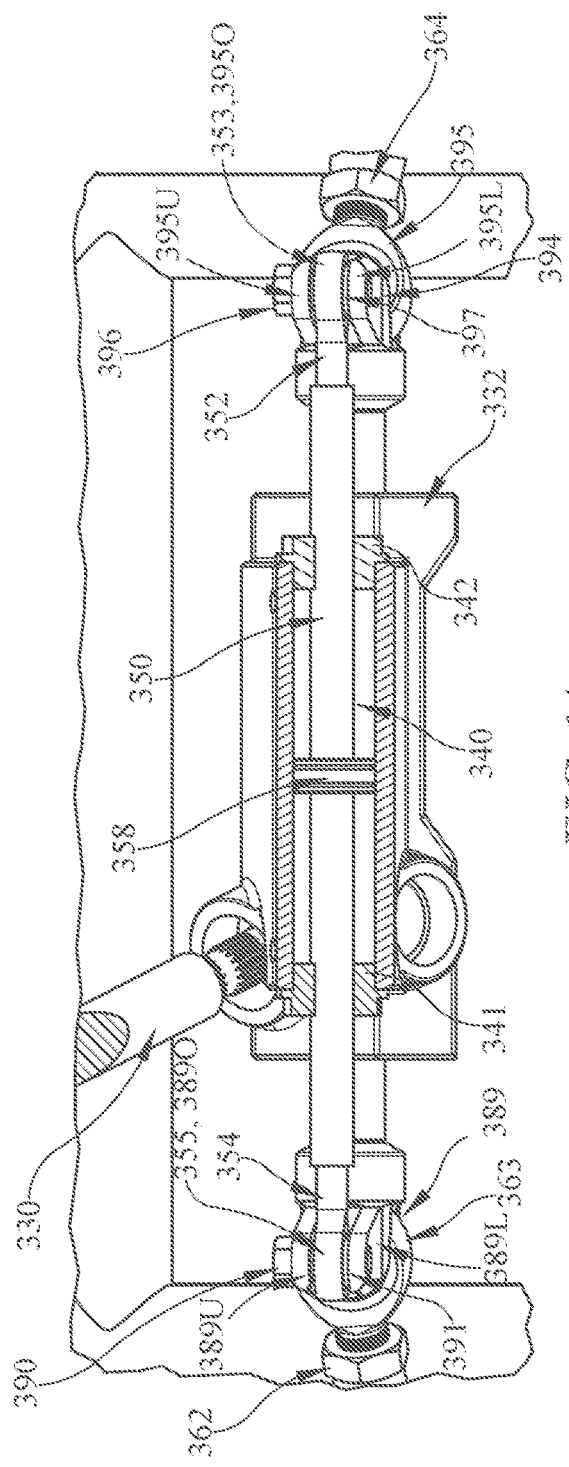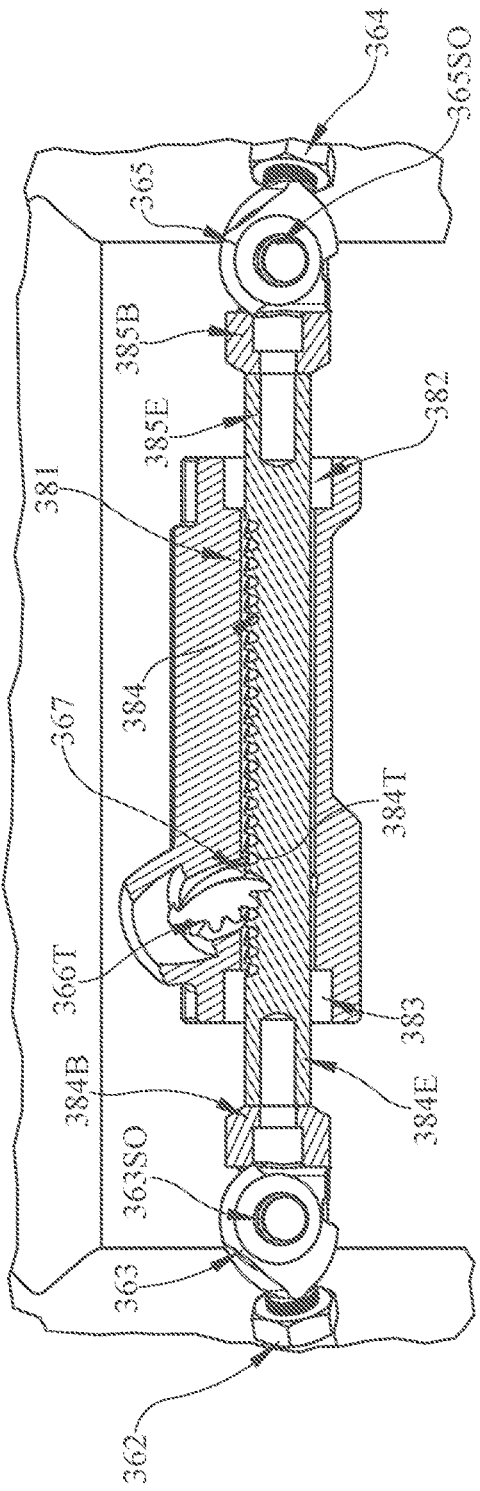
FIG. 14
FIG. 15

STEERING SYSTEM

PRIORITY CLAIM

This application claims priority under 35 U.S.C. § 119(e) to U.S. Provisional Application No. 63/170,408, filed Apr. 2, 2021, which is expressly incorporated by reference herein.

BACKGROUND

The present disclosure relates to steering systems for motorized vehicles, in particular steering systems configured to utilize hydraulics.

Many vehicles, in particular all-terrain vehicles and utility-terrain vehicles, include rack and pinion steering assemblies. Many of these all-terrain and utility-terrain vehicles include large wheel and tire configurations which can be problematic for stock rack and pinion steering assemblies due to the increased load placed on the steering assembly by that larger wheel and tire configurations. Stock rack and pinion steering assemblies are often undersized for these types of applications involving large wheels and tires, and as such, often include undersized and weak components susceptible to wear. Such inadequacies involved with stock rack and pinion steering assemblies are especially prevalent with high-angle lift kits which are utilized to raise the height of stock suspensions of all-terrain and utility-terrain vehicles. As such, an improved steering assembly for vehicles in which stock rack and pinion steering assemblies do not provide adequate load support for oversized tires, wheels, and high-angle lift kit assemblies is desired.

SUMMARY

According to the present disclosure, a steering system for a vehicle includes a steering control, a steering assist assembly operably connected to the steering control, and at least one anti-rotation arm. The steering control is configured to receive user input in order to control turning of wheels of the vehicle. The steering assist assembly includes a housing having a first axially facing side and a second axially facing side located opposite the first axially facing side, the housing including a first cylinder formed therein and extending axially and opening at the first and second axially facing sides, the first cylinder defining a hollow interior space, the housing including a second cylinder formed therein and spaced apart from the first cylinder, the second cylinder extending axially and opening at the first and second axially facing sides. The steering assists assembly further includes a piston slidably arranged within the first cylinder such that the piston is configured to move axially within the first cylinder, and an axial rod slidably arranged within the second cylinder such that the axial rod is configured to move axially within the second cylinder.

The steering assists assembly further includes first and second tie rods and a shaft. The first tie rod is connected to a first axial end of the axial rod and the second tie rod is connected to a second axial end of the axial rod opposite the first axial end. The shaft is operably connected to the steering control and configured to rotate therewith, the shaft configured to engage with the axial rod such that rotation of the shaft causes axial movement of the axial rod, the axial movement of the axial rod causing axial movement of the first and second tie rods so as to turn the wheels of the vehicle. The steering system further includes at least one anti-rotation arm operably connected to the piston and to the axial rod, the at least one anti-rotation feature configured to prevent rotation of the piston and the axial rod.

In some embodiments, the at least one anti-rotation arm includes a first anti-rotation arm and a second anti-rotation arm. A first end of the first anti-rotation arm is operably connected to a first axial end of the piston and a second end of the first anti-rotation arm is operably connected to the first axial end of the axial rod. A first end of the second anti-rotation arm is operably connected to a second axial end of the piston opposite the first axial end, and a second end of the second anti-rotation arm is operably connected to the second axial end of the axial rod.

In some embodiments, the first axial end of the axial rod is located generally adjacent to the first axial end of the piston, and the second axial end of the axial rod is located generally adjacent to the second axial end of the piston.

In some embodiments, the axial rod includes first and second attachment members arranged at the first and second axial ends of the axial rod and configured to operably connect the axial rod to the first and second tie rods, respectively. Each of the first anti-rotation arm and the second anti-rotation arm includes a cantilevered extension that is coupled to a side surface of the first and second attachment members, respectively. The cantilevered extension of each of the first and second anti-rotation arms includes an upper extension arm and a lower extension arm spaced apart from and formed substantially parallel to the upper extension arm.

In some embodiments, the piston includes third and fourth attachment members arranged at the first and second axial ends of the piston and configured to operably connect the piston to terminal ends of the upper and lower extension arms located opposite ends of the upper and lower extension arms that are coupled to the first and second attachment members.

In some embodiments, the first and second anti-rotation arms each further include a spherical bearing arranged between the upper and lower extension arms, and the third and fourth attachment members are configured to surround and engage the spherical bearing of a respective anti-rotation arm of the first and second anti-rotation arms.

In some embodiments, the steering system further includes a fluid supply system operably connected to the steering control and to the steering assist assembly, the fluid supply system configured to supply and remove fluid from the hollow interior space of the first cylinder so as to partially control axial movement of the piston along with axial movement of the axial rod caused by rotation of the shaft. In some embodiments, the fluid supply system includes a hydraulic metering valve and a pump. The hydraulic metering valve is operably connected to the steering control and to the pump. The hydraulic metering valve is configured to direct fluid from the pump to a first portion of the hollow interior space of the first cylinder and configured to direct fluid away from a second portion of the hollow interior space of the first cylinder, the first and second portions of the hollow interior space being defined by a central disk of the piston that circumferentially contacts an inner surface of the first cylinder so as to fluidically seal the first portion from the second portion.

In some embodiments, the hydraulic metering valve is configured to direct fluid from the pump to the first portion of the hollow interior space of the cylinder and configured to direct fluid away from a second portion of the hollow interior space of the cylinder in response to the steering control being in a predetermined position such that the axial movement of the piston corresponds to the axial movement of the axial rod caused by rotation of the shaft.

In some embodiments, the steering control is a steering wheel. The steering wheel being turned in a counterclockwise direction to a first predetermined position causes (i) the shaft to rotate and engage with the axial rod so as to move the axial rod in a first axial direction a first predetermined distance, and (ii) the hydraulic metering valve to direct fluid to and remove fluid from the hollow interior space such that the piston moves the first predetermined distance in the first axial direction. The steering wheel being turned in a clockwise direction to a second predetermined position causes (i) the shaft to rotate and engage with the axial rod so as to move the axial rod in a second axial direction a second predetermined distance, and (ii) the hydraulic metering valve to direct fluid to and remove fluid from the hollow interior space such that the piston moves the second predetermined distance in the second axial direction.

In some embodiments, the shaft includes a plurality of first teeth located at a terminal end adjacent the axial rod, and the axial rod includes a plurality of second teeth adjacent the plurality of first teeth such that engagement of the plurality of first teeth with the plurality of second teeth when the shaft rotates causes axial movement of the axial rod.

In some embodiments, the housing further includes a first connection hole and a second connection hole spaced apart from the first connection hole, each of the first and second connection holes being formed through an outer surface of the housing and extending into the hollow interior space of the cylinder. The first connection hole extends into a first portion of first cylinder and the second connection hole extends into a second portion of the first cylinder, the first and second portions of the hollow interior space being defined by a central disk of the piston that circumferentially contacts an inner surface of the first cylinder so as to fluidically seal the first portion from the second portion. A first plug closes a first axial end opening of the first cylinder adjacent the first portion and a second plug closes a second axial end opening of the first cylinder adjacent the second portion. The first and second portions are at least partially filled with fluid.

In some embodiments, the steering assist assembly further includes a fluidic connection component attached to the first and second connection holes, the fluidic connection component fluidically connecting the first portion to the second portion of the hollow interior space of the first cylinder. Axial movement of the piston causes the fluid to flow from one of the first and second portions to the other of the first and second portions via the fluidic connection component, the flow of the fluid configured to damp vibrations caused by movement of the piston and the axial rod within the first and second cylinders and caused by movement of the vehicle.

According to a further aspect of the present disclosure, a vehicle includes a vehicle chassis, a front wheel assembly, and a steering system. The front wheel assembly is coupled to the vehicle chassis and includes a left wheel, a right wheel, a first tie rod operably connected to the left wheel, and a second tie rod operably connected to the right wheel. The steering system is configured to steer the left wheel and the right wheel of the front wheel assembly. The steering system includes a steering control, a steering assist assembly operably connected to the steering control, and at least one anti-rotation arm. The steering control is configured to receive user input in order to control turning of wheels of the vehicle.

The steering assist assembly includes a housing having a first axially facing side and a second axially facing side located opposite the first axially facing side, the housing including a first cylinder formed therein and extending axially and opening at the first and second axially facing sides, the first cylinder defining a hollow interior space, the housing including a second cylinder formed therein and spaced apart from the first cylinder, the second cylinder extending axially and opening at the first and second axially facing sides. The steering assists assembly further includes a piston slidably arranged within the first cylinder such that the piston is configured to move axially within the first cylinder, and an axial rod slidably arranged within the second cylinder such that the axial rod is configured to move axially within the second cylinder.

The steering assists assembly further includes first and second tie rods and a shaft. The first tie rod is connected to a first axial end of the axial rod and the second tie rod is connected to a second axial end of the axial rod opposite the first axial end. The shaft is operably connected to the steering control and configured to rotate therewith, the shaft configured to engage with the axial rod such that rotation of the shaft causes axial movement of the axial rod, the axial movement of the axial rod causing axial movement of the first and second tie rods so as to turn the wheels of the vehicle. The steering system further includes at least one anti-rotation arm operably connected to the piston and to the axial rod, the at least one anti-rotation feature configured to prevent rotation of the piston and the axial rod.

In some embodiments, the housing includes a first axially facing side and a second axially facing side located opposite the first axially facing side. The housing includes a first cylinder formed therein and extending axially and opening at the first and second axially facing sides, the first cylinder defining a hollow interior space in which the piston is slidably arranged. The housing includes a second cylinder formed therein and spaced apart from the first cylinder, the second cylinder extending axially and opening at the first and second axially facing sides, the second cylinder defining a hollow interior space in which the axial rod is slidably arranged.

In some embodiments, the at least one anti-rotation arm includes a first anti-rotation arm and a second anti-rotation arm. A first end of the first anti-rotation arm is operably connected to a first axial end of the piston and a second end of the first anti-rotation arm is operably connected to the first axial end of the axial rod. A first end of the second anti-rotation arm is operably connected to a second axial end of the piston opposite the first axial end, and a second end of the second anti-rotation arm is operably connected to the second axial end of the axial rod.

In some embodiments, the first axial end of the axial rod is located generally adjacent to the first axial end of the piston, and the second axial end of the axial rod is located generally adjacent to the second axial end of the piston.

In some embodiments, the vehicle further includes a fluid supply system operably connected to the steering control and to the steering assist assembly, the fluid supply system configured to supply and remove fluid from the hollow interior space of the first cylinder so as to partially control axial movement of the piston along with axial movement of the axial rod caused by rotation of the shaft. In some embodiments, the fluid supply system includes a hydraulic metering valve and a pump. The hydraulic metering valve is operably connected to the steering control and to the pump. The hydraulic metering valve is configured to direct fluid from the pump to a first portion of the hollow interior space of the first cylinder and configured to direct fluid away from a second portion of the hollow interior space of the first cylinder, the first and second portions of the hollow interior space being defined by a central disk of the piston that circumferentially contacts an inner surface of the first cylinder so as to fluidically seal the first portion from the second portion.

In some embodiments, the hydraulic metering valve is configured to direct fluid from the pump to the first portion of the hollow interior space of the cylinder and configured to direct fluid away from a second portion of the hollow interior space of the cylinder in response to the steering control being in a predetermined position such that the axial movement of the piston corresponds to the axial movement of the axial rod caused by rotation of the shaft.

In some embodiments, the housing further includes a first connection hole and a second connection hole spaced apart from the first connection hole, each of the first and second connection holes being formed through an outer surface of the housing and extending into the hollow interior space of the cylinder. The first connection hole extends into a first portion of first cylinder and the second connection hole extends into a second portion of the first cylinder, the first and second portions of the hollow interior space being defined by a central disk of the piston that circumferentially contacts an inner surface of the first cylinder so as to fluidically seal the first portion from the second portion. A first plug closes a first axial end opening of the first cylinder adjacent the first portion and a second plug closes a second axial end opening of the first cylinder adjacent the second portion. The first and second portions are at least partially filled with fluid. The steering assist assembly further includes a fluidic connection component attached to the first and second connection holes, the fluidic connection component fluidically connecting the first portion to the second portion of the hollow interior space of the first cylinder. Axial movement of the piston causes the fluid to flow from one of the first and second portions to the other of the first and second portions via the fluidic connection component, the flow of the fluid configured to damp vibrations caused by movement of the piston and the axial rod within the first and second cylinders and caused by movement of the vehicle.

According to another aspect of the present disclosure, a method of controlling steering of a vehicle, includes receiving a predetermined position of a steering control of the vehicle, the vehicle including a steering system including a steering assist assembly having an axially movable piston arranged in an axially extending first cylinder located within a housing of the steering assist assembly, the steering assist assembly further including an axially movable axial rod slidably arranged within an axially extending second cylinder located within the housing, the steering assist assembly further including a first tie rod connected to a first axial end of the axial rod and a second tie rod connected to a second axial end of the axial rod opposite the first axial end.

The method further includes moving the axial rod based on the predetermined position of the steering wheel via rotation of a shaft operably connected to the steering control and configured to engage the axial rod so as to axially move the axial rod, the rotation of the shaft causing the axial rod to axially move and arrange the axial rod in a first axial position that corresponds to the predetermined position of the steering control. Axial movement of the axial rod at least partially causes the first and second tie rods to axially move.

The method further includes supplying and removing fluid to and from a hollow interior space defined within the first cylinder based on the predetermined position of the steering control via a fluid supply system operably connected to the steering control and to the steering assist assembly in order to control axial movement of the piston and arrange the piston in a first axial position that corresponds to the predetermined position of the steering control. Axial movement of the piston at least partially causes the first and second tie rods to axially move along with the axial movement of the axial rod. The steering system includes at least one anti-rotation arm operably connected to the piston and to the axial rod, the at least one anti-rotation feature configured to prevent rotation of the piston and the axial rod.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a hydraulic steering system for a vehicle according to the present disclosure, showing that the system includes a steering control, a first tie rod and a second tie rod, a hydraulic steering cylinder assembly including an axially movable piston arranged in a hollow interior space of a cylinder arranged within the a housing of the hydraulic steering cylinder assembly, and two anti-rotation features coupled to the housing of the hydraulic steering cylinder assembly and operably connected to the piston, the anti-rotation features being configured to prevent rotation of the piston via the connection to the piston;

Figure 1:
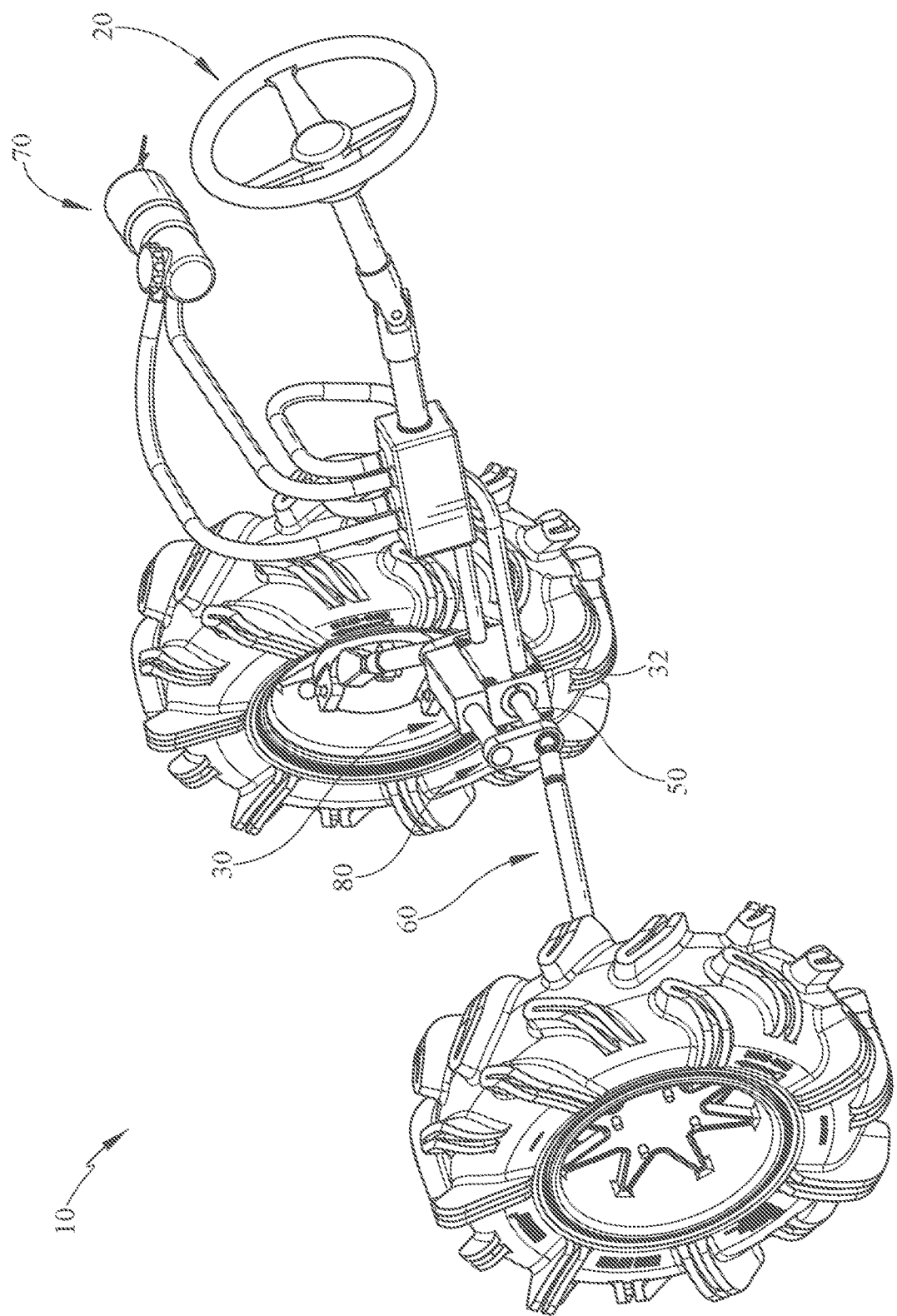
Figure 6:
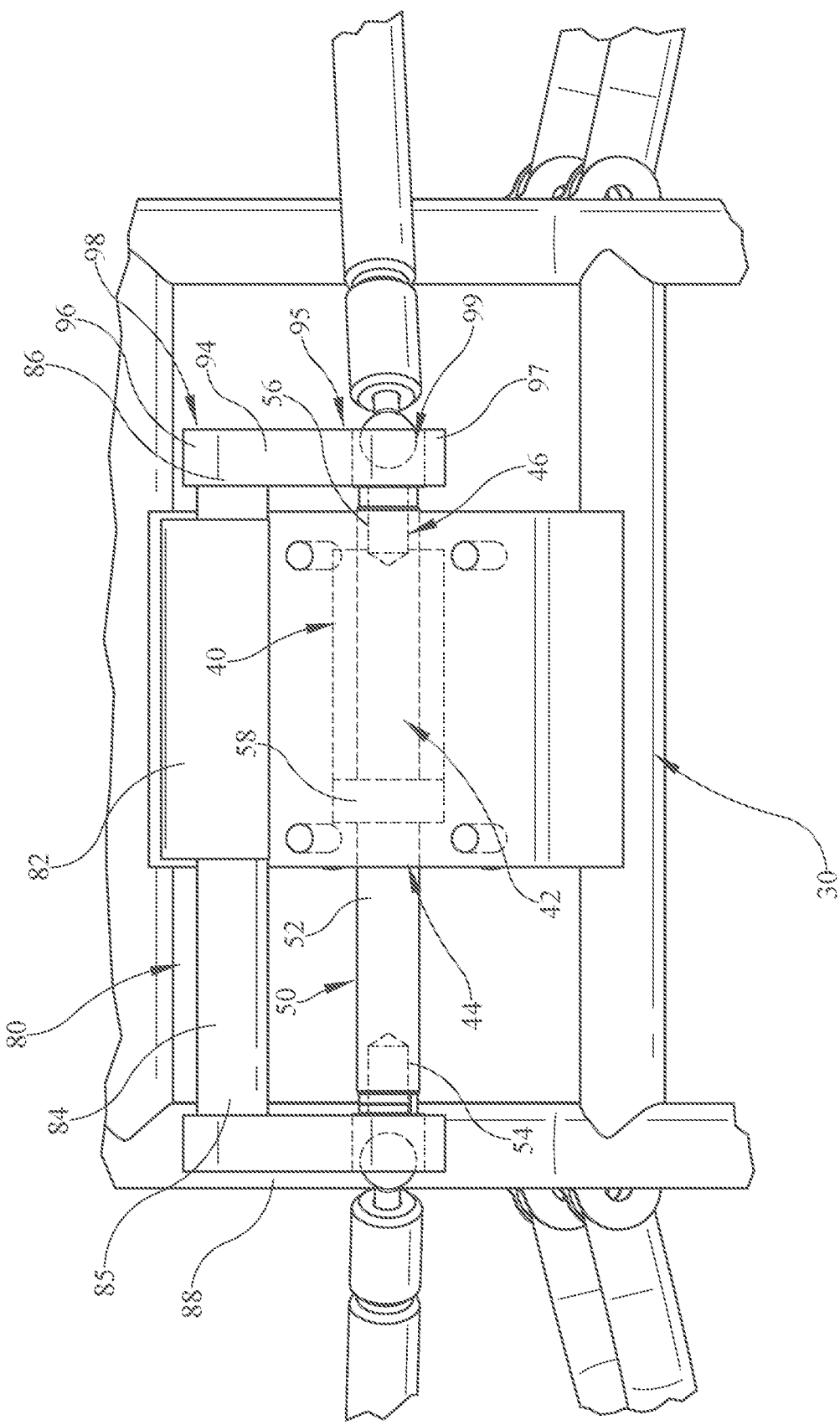
Figure 7:
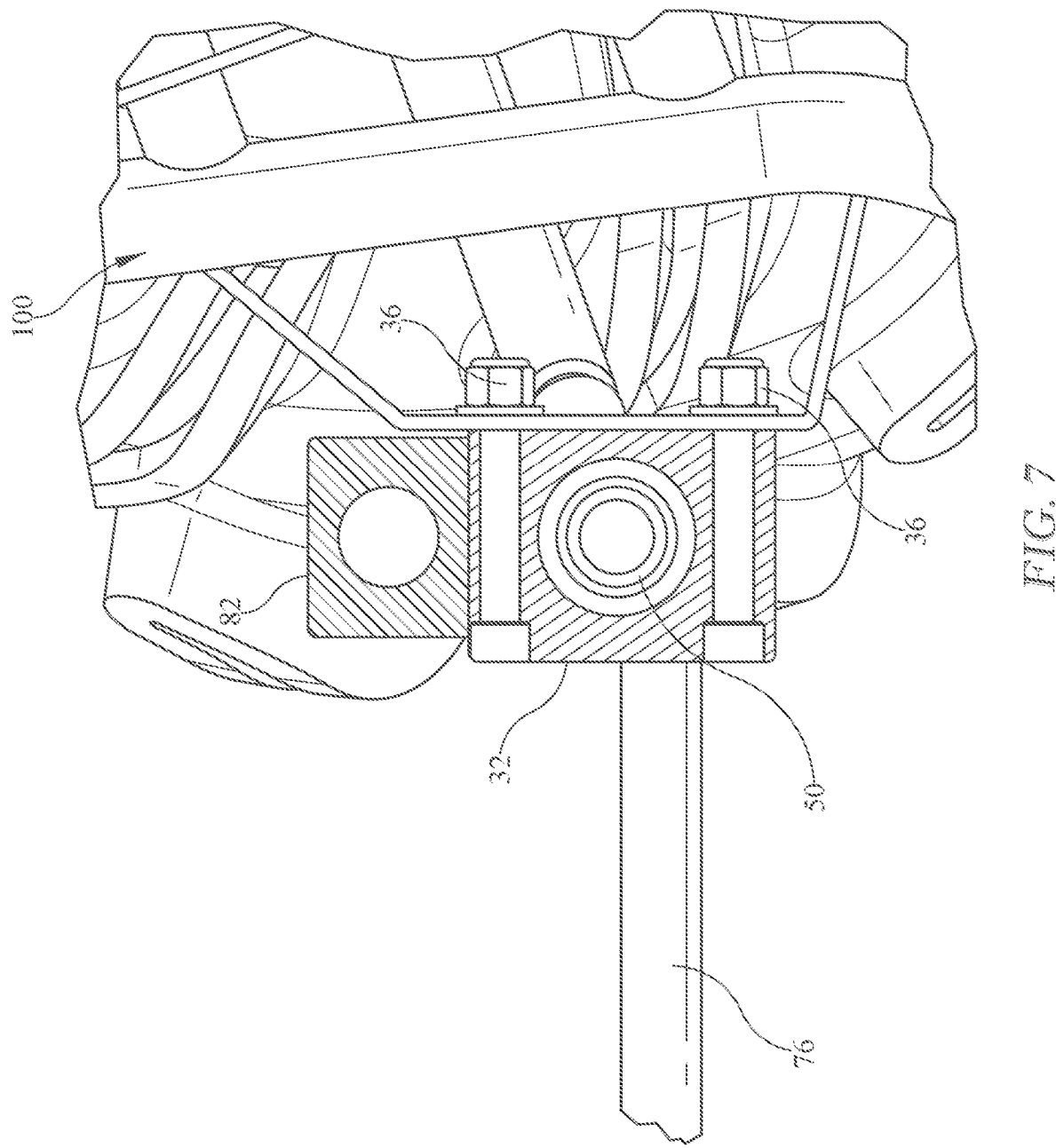
Figure 8:
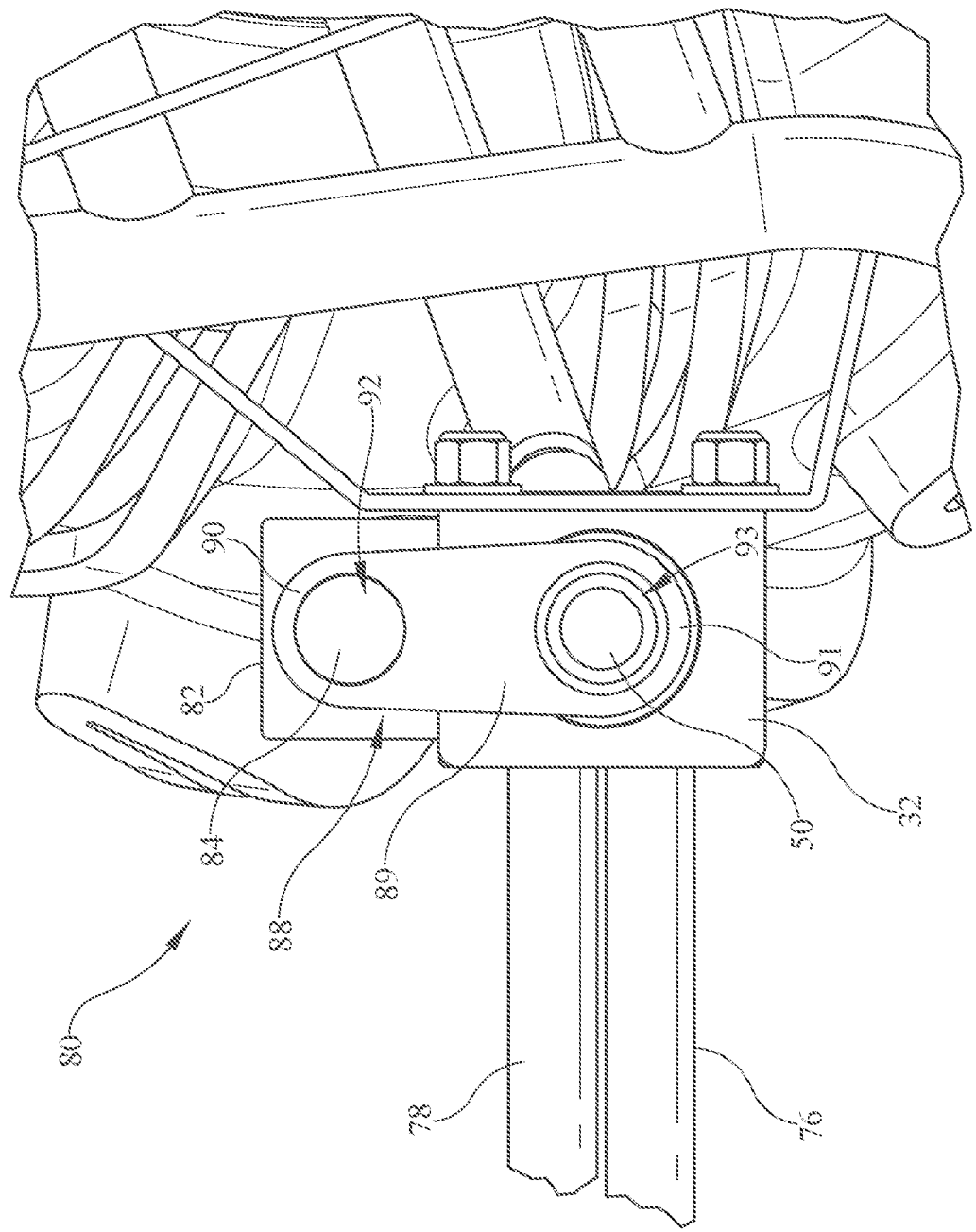
Figure 9:
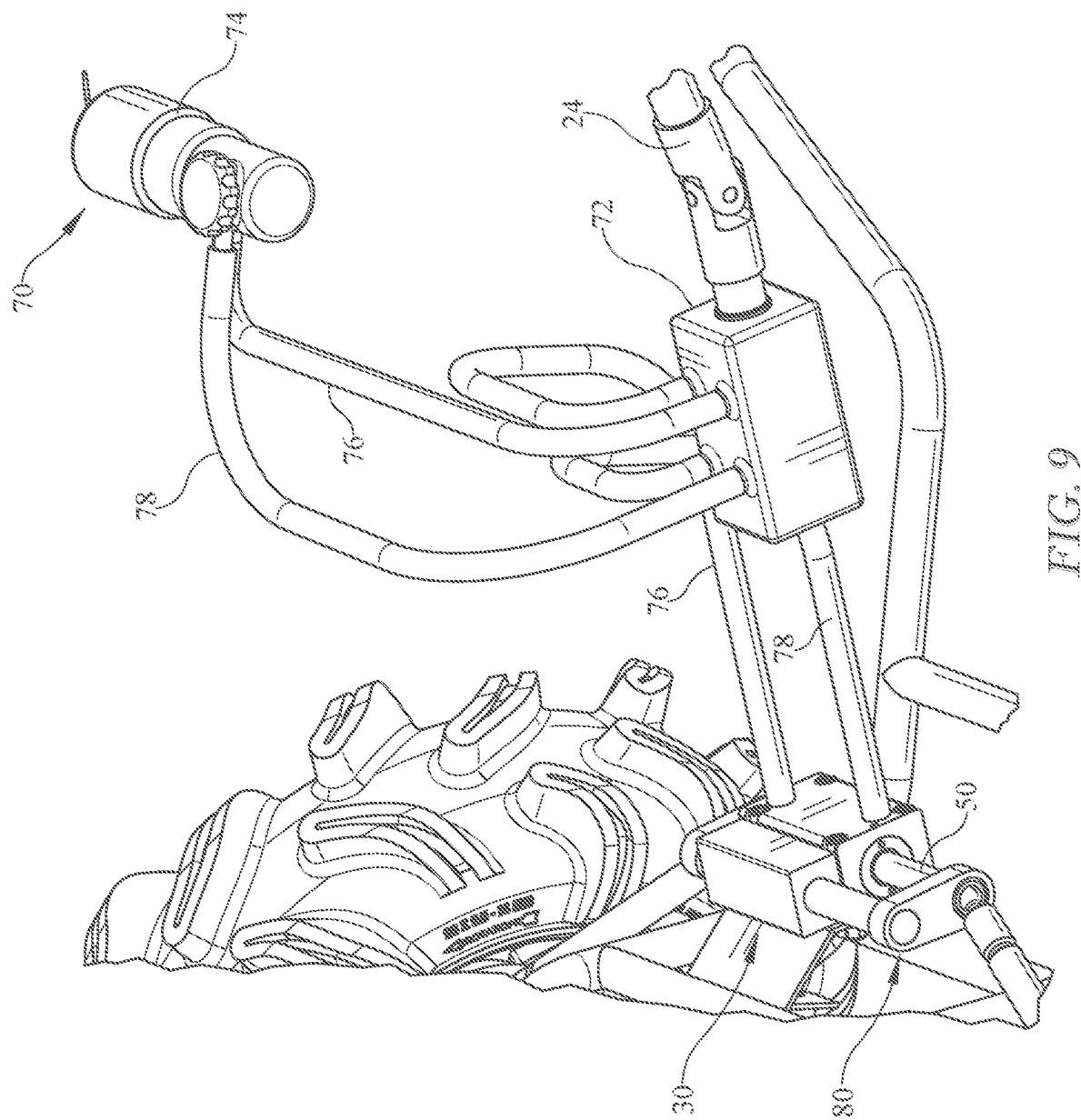
Figure 10:
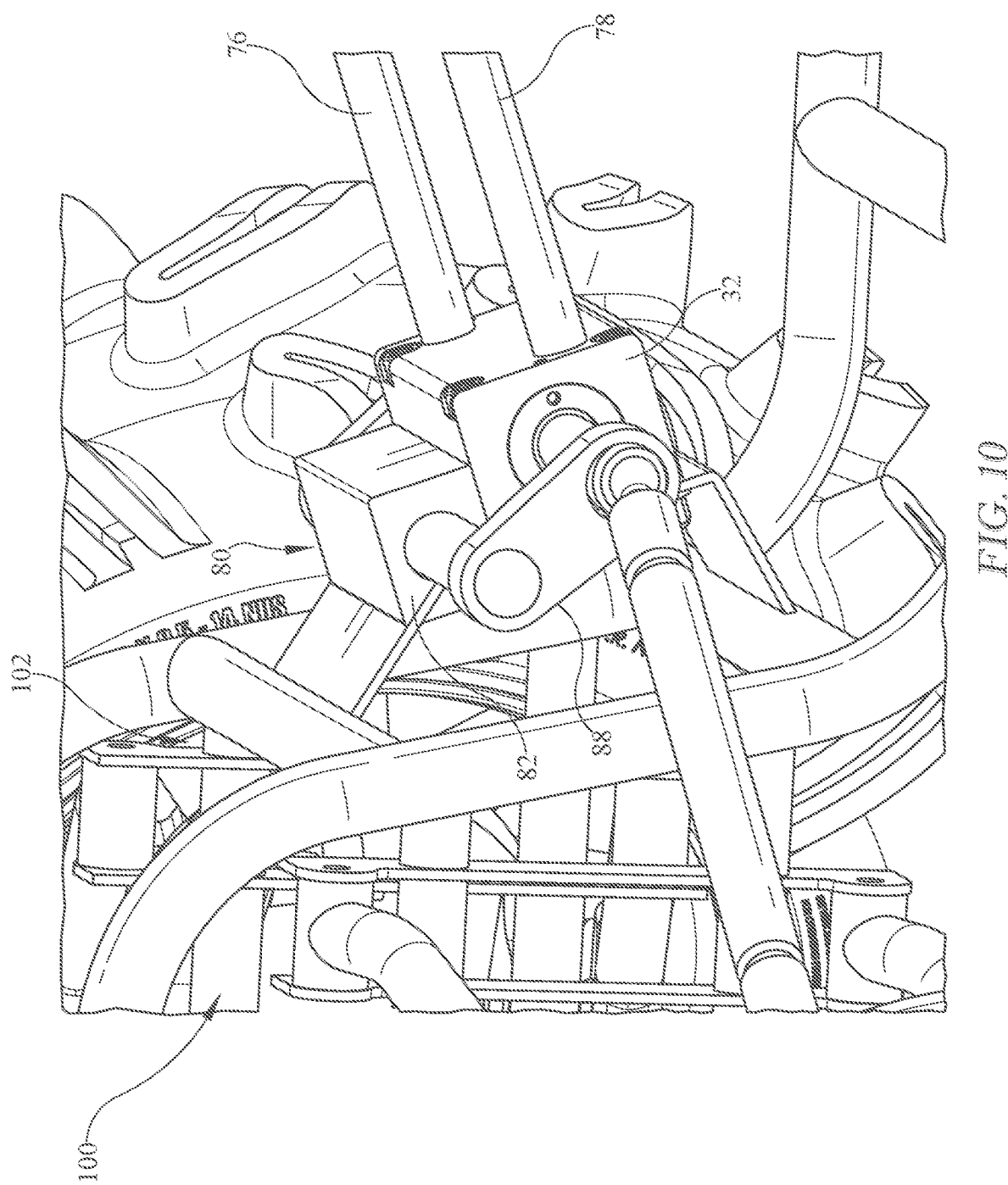
Figure 11:
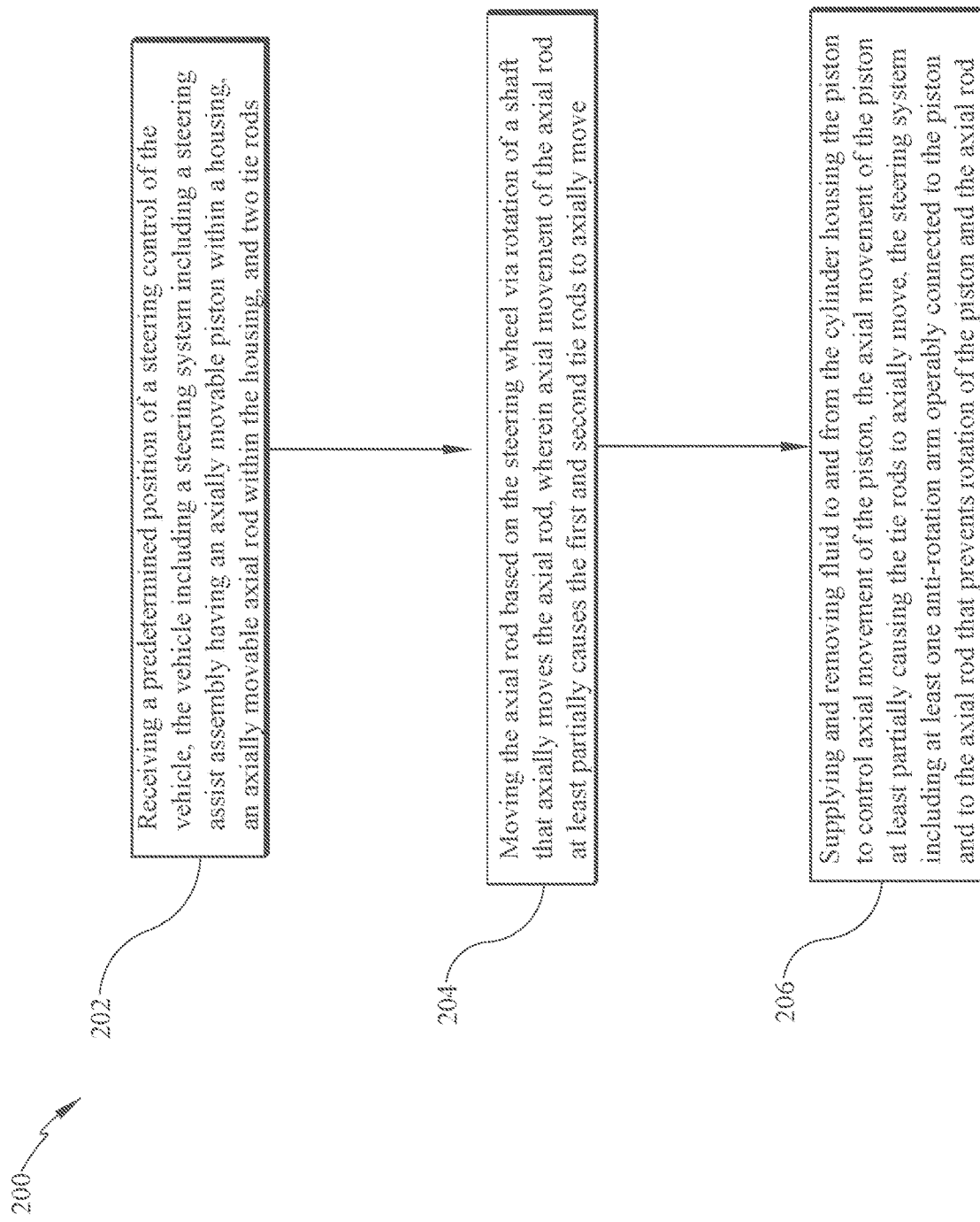
Figure 12:
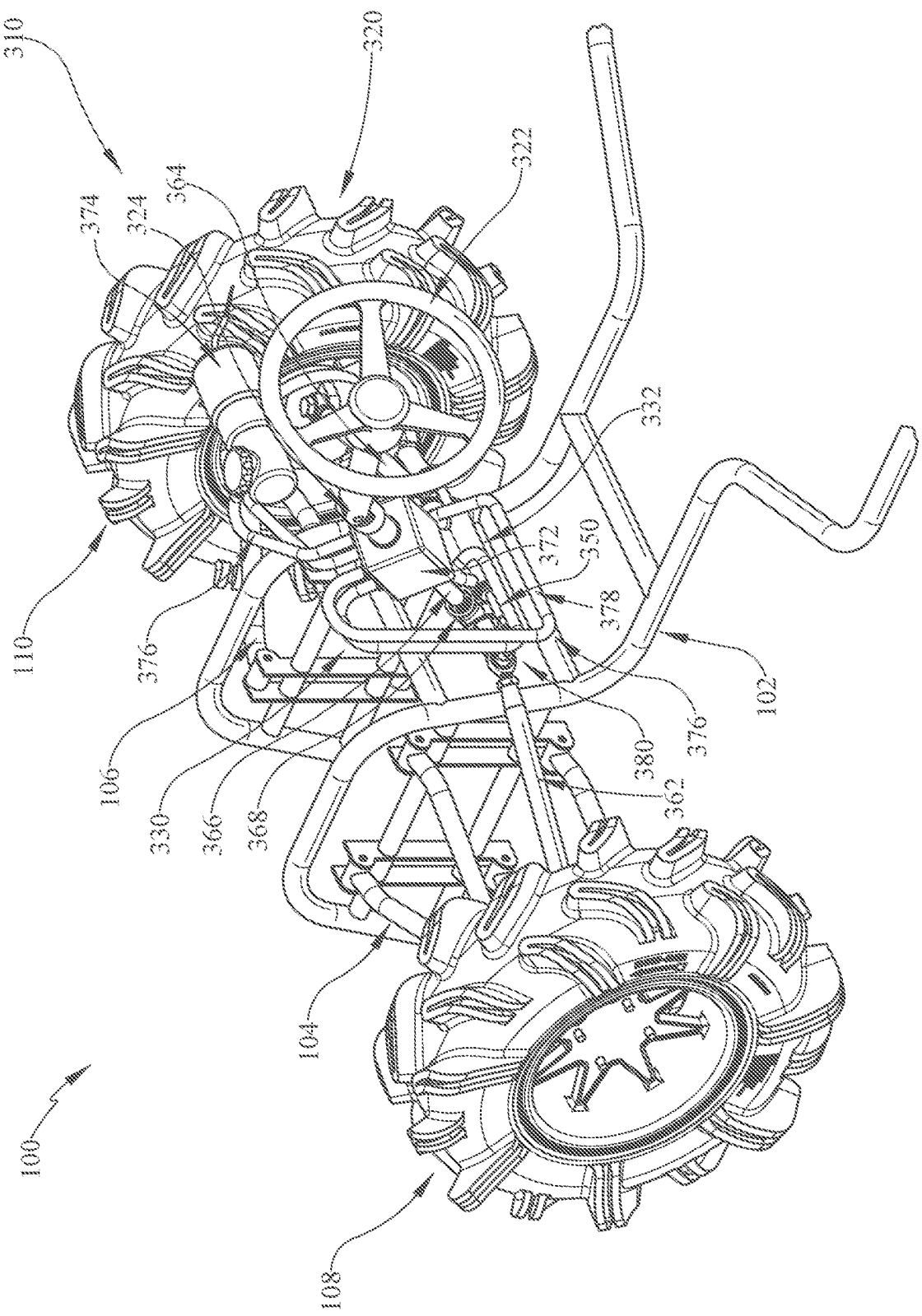
Figure 13:
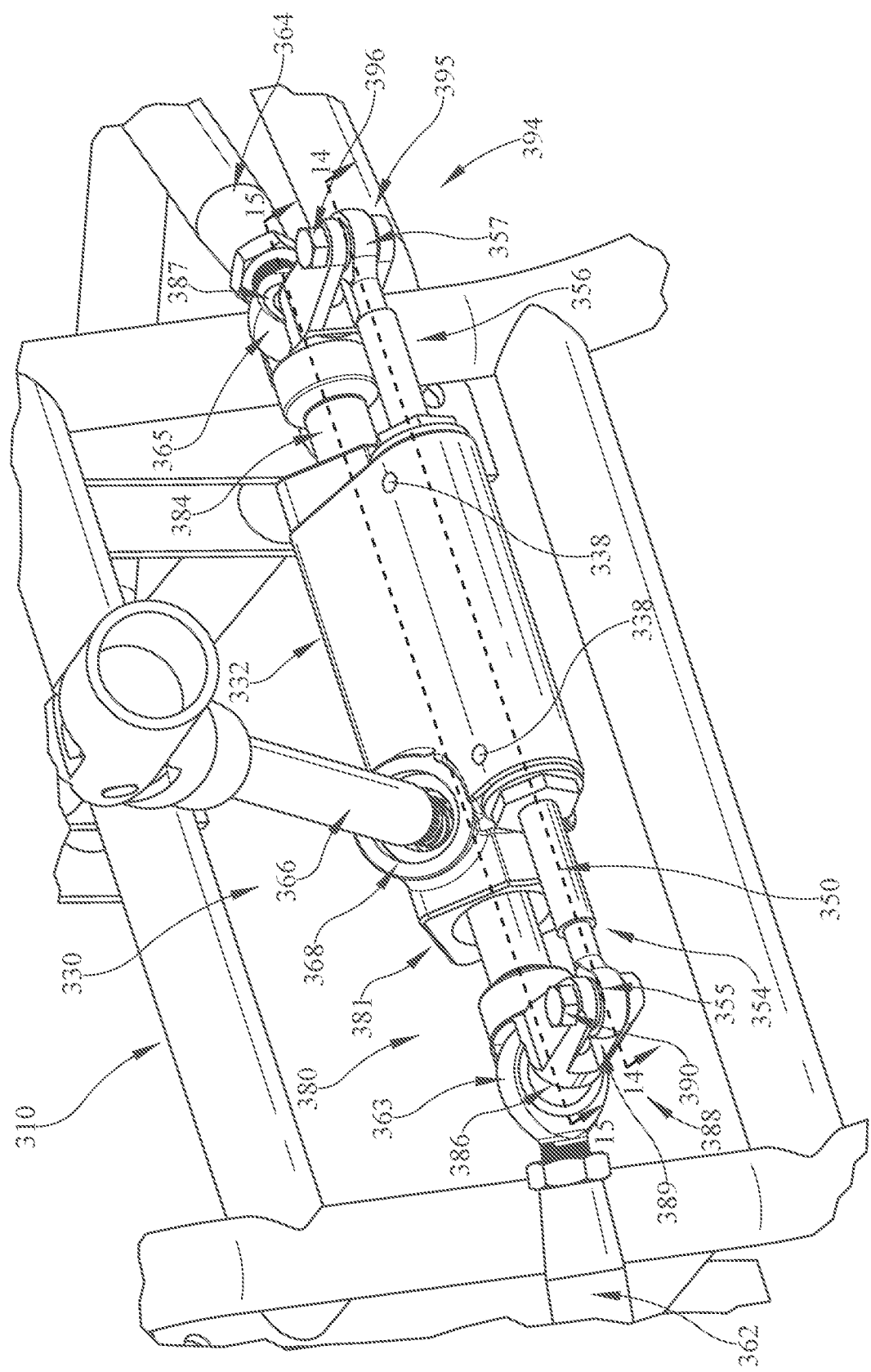
Figure 16:
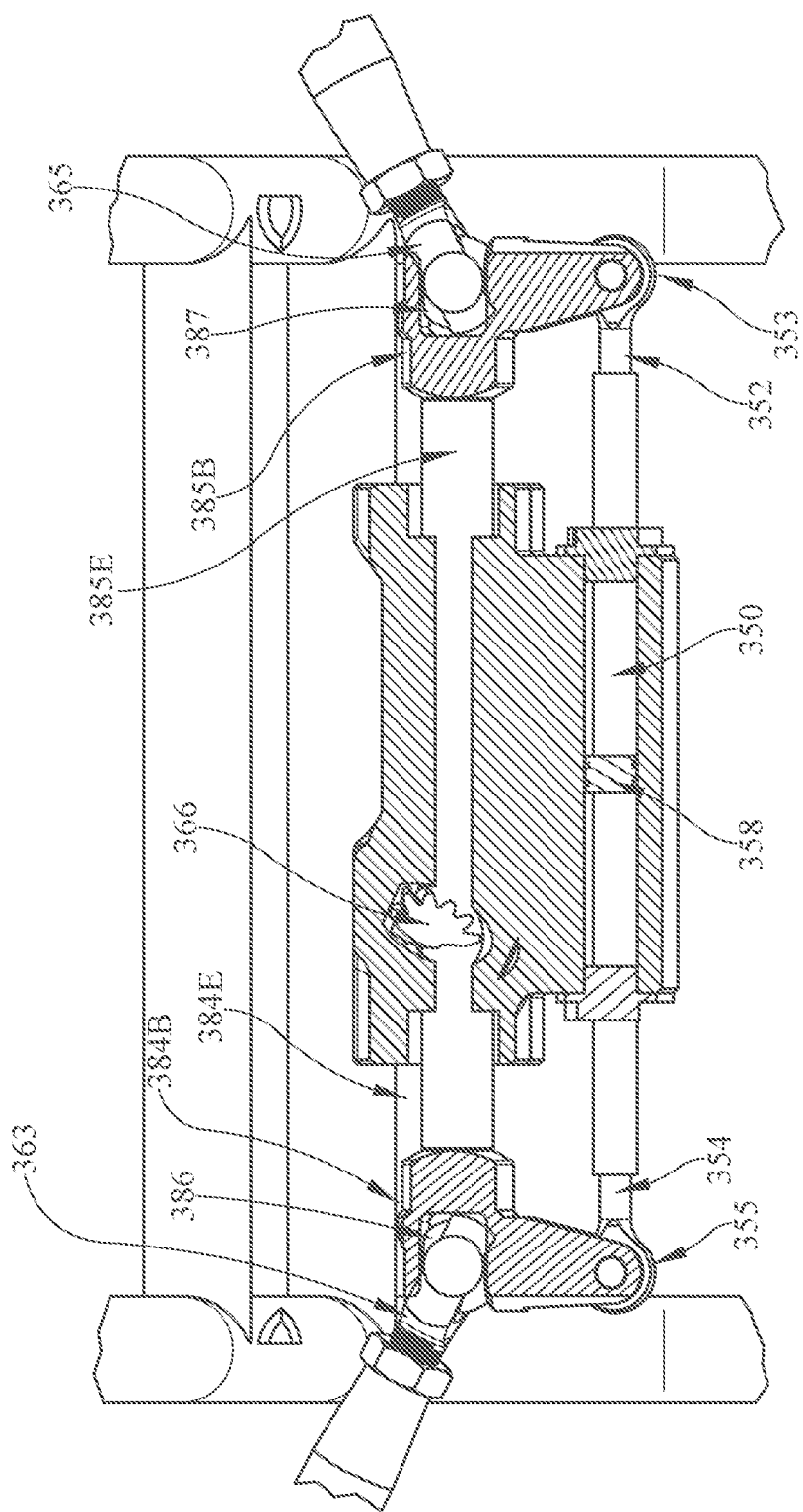
Figure 17:
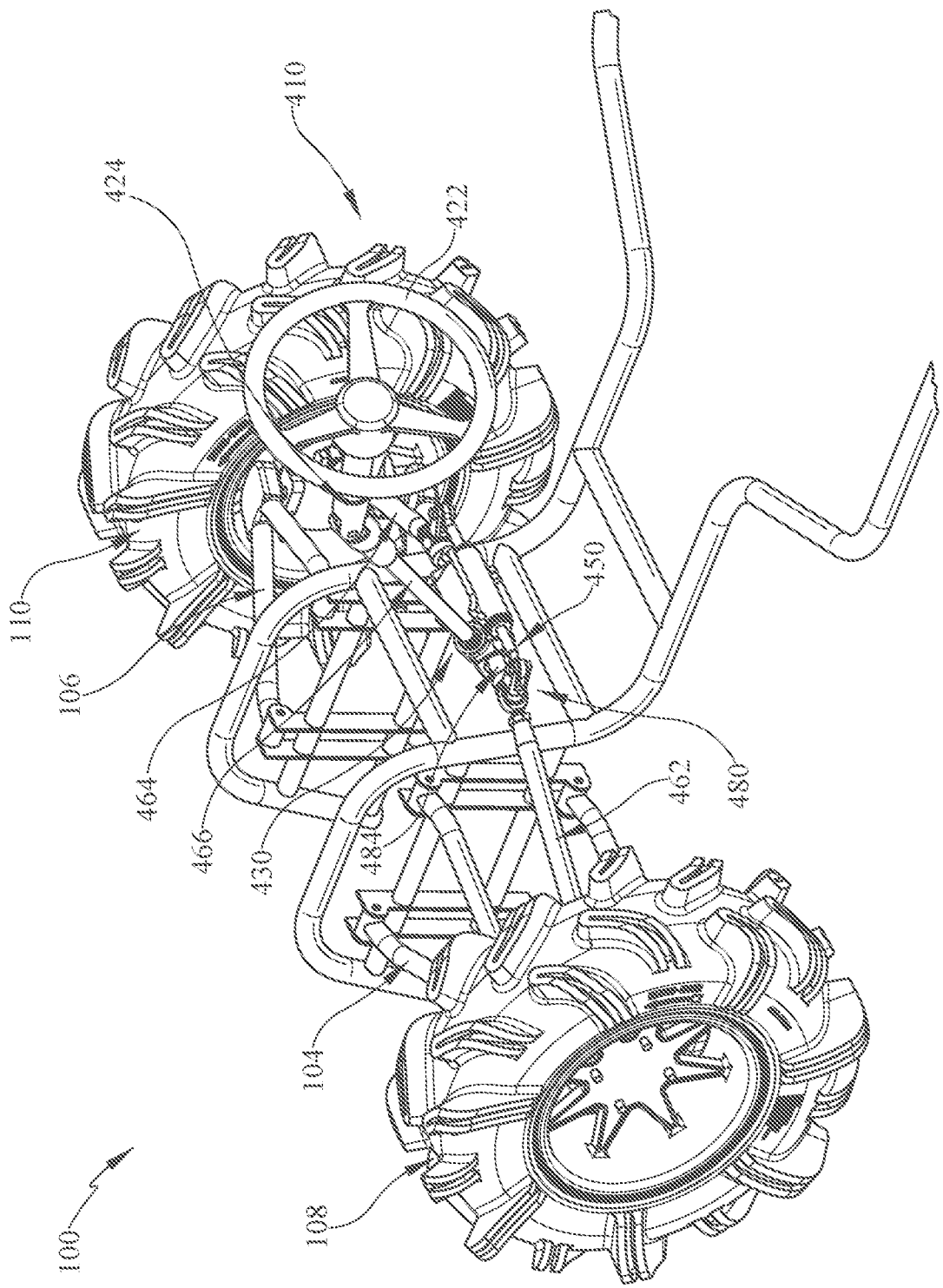
Figure 18:
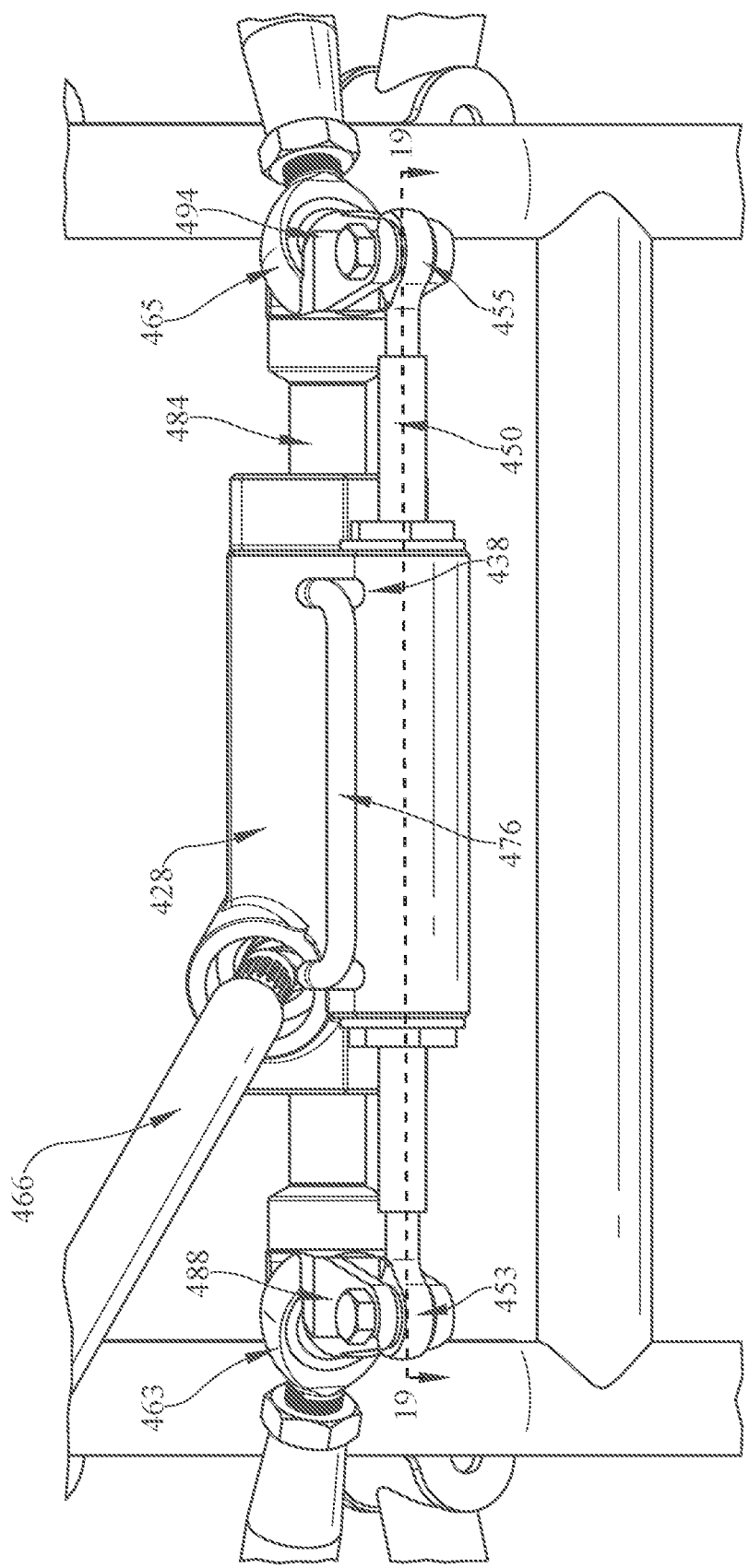
Figure 19:
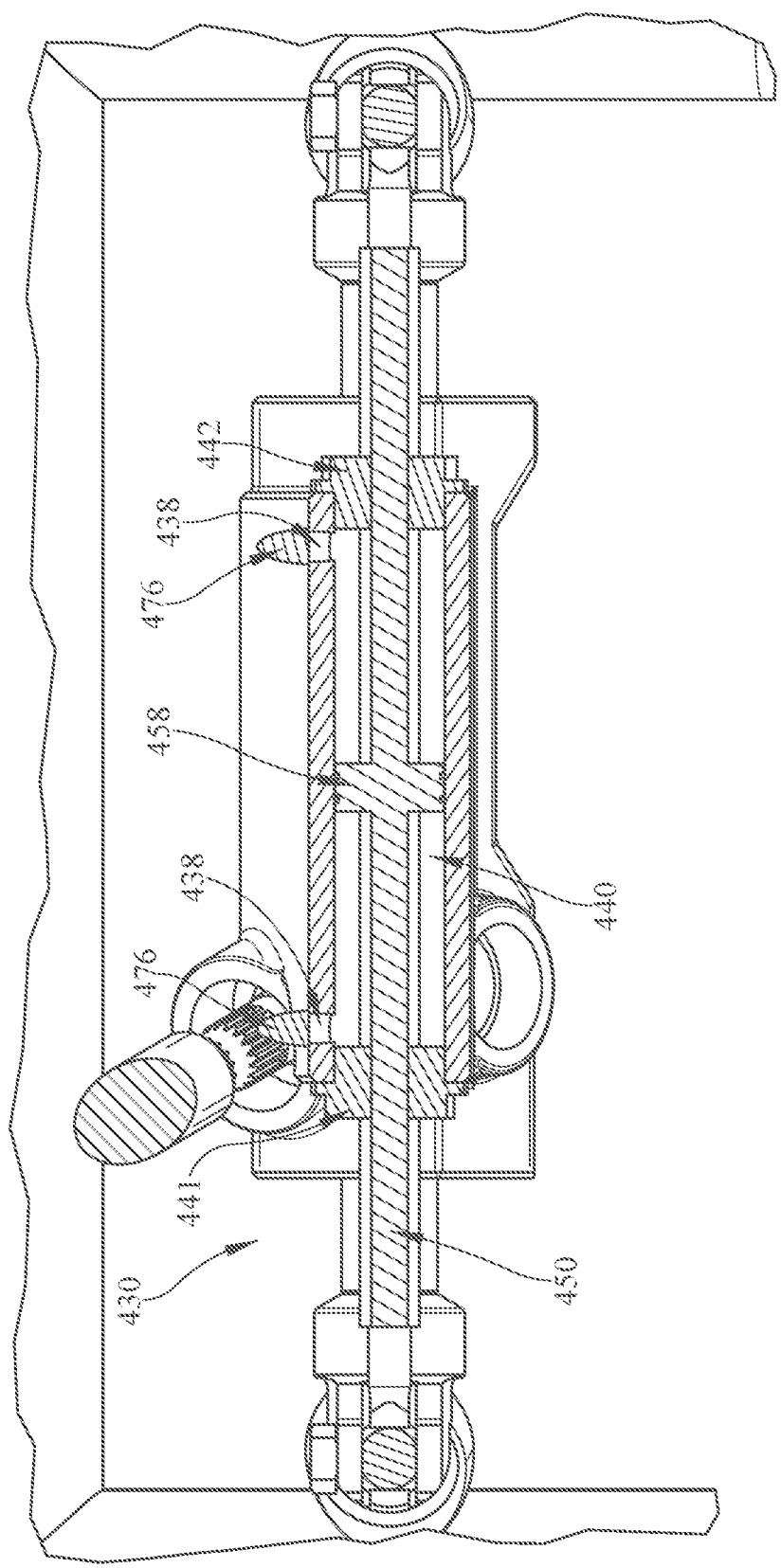

FIG. 6 is a cross-sectional view of the hydraulic steering system of FIG. 1, showing a cross-section of the hydraulic steering cylinder assembly and suggesting that the hydraulic steering cylinder assembly includes a cylinder having a hollow interior space defined within the hydraulic steering cylinder assembly and a piston slidably arranged within the hollow interior space so as to allow axial movement of the piston;

FIG. 7 is a cross-sectional view of the hydraulic steering system of FIG. 1, showing an axial cross-section of the hydraulic steering cylinder assembly having the piston arranged within the hollow interior space of the cylinder, and showing the anti-rotation features coupled to the housing of the hydraulic steering cylinder assembly and an axial rod extending through the a housing of the anti-rotation features;

FIG. 8 is a cross-sectional view of the anti-rotation features of FIG. 6, showing a view of the anti-rotation arm of the anti-rotation features, and suggesting that the anti-rotation arm includes an annular hole through which the axial rod extends and a further annular hole through which the piston of the hydraulic steering cylinder assembly extends;

FIG. 9 is a perspective view of a hydraulic metering valve and a pump of the hydraulic steering system of FIG. 1, showing that the hydraulic metering valve is connected to the hydraulic steering cylinder assembly and the pump so as to control a steering direction of the steering system;

FIG. 10 is a perspective side view of an alternative embodiment of the anti-rotation features of FIGS. 1-8, showing the housing of the anti-rotation features coupled to a vehicle chassis of the vehicle as well as the housing of the hydraulic steering cylinder assembly;

FIG. 11 shows a method of controlling the steering of a vehicle according to the present disclosure;

FIG. 12 is a perspective view of a hydraulic-assisted steering system for a vehicle according to a further aspect of the present disclosure, showing that the system includes a steering control, a first tie rod and a second tie rod, a hydraulic-assisted steering cylinder assembly including an axially movable piston arranged in a hollow interior space of a cylinder arranged within the a housing of the hydraulic steering cylinder assembly, a mechanical steering assembly, also referred to as a rack and pinion steering system, and two anti-rotation features operably connected to the hydraulic steering cylinder assembly and the mechanical steering assembly, the anti-rotation features being configured to prevent rotation of the piston of the hydraulic steering cylinder assembly and prevent rotation of the mechanical steering assembly via the connection between the mechanical steering assembly and the piston;

FIG. 13 is a perspective view of the hydraulic-assisted steering system of FIG. 12, showing the hydraulic-assisted steering cylinder assembly, the mechanical steering assembly, and the anti-rotation features connected to the hydraulic steering cylinder assembly and the mechanical steering assembly;

FIG. 14 is a top cross-sectional view of the hydraulic-assisted steering system of FIG. 12 taken along line 14-14 of FIG. 13, showing the hollow cylinder and piston of the hydraulic-assisted steering cylinder assembly, and showing portions of the anti-rotation features connected to opposing ends of the piston;

FIG. 15 is a top cross-sectional view of the hydraulic-assisted steering system of FIG. 12 taken along line 15-15 of FIG. 13, showing the axial rod of the mechanical steering assembly, and showing portions of the anti-rotation features connected to opposing ends of the axial rod;

FIG. 16 is a top cross-sectional view of the hydraulic-assisted steering system of FIG. 13, showing the axial rod of the mechanical steering assembly terminating in ball bearing support members that are each arranged to interact with a ball bearing located within the respective anti-rotation feature;

FIG. 17 is a perspective view of a damped steering system for a vehicle according to a further aspect of the present disclosure, showing that the system includes a steering control, a first tie rod and a second tie rod, a damping cylinder assembly including an axially movable piston arranged in a hollow interior space of a cylinder arranged within the a housing of the damping cylinder assembly, a mechanical steering assembly, and two anti-rotation features operably connected to the damping cylinder assembly and the mechanical steering assembly, the anti-rotation features being configured to prevent rotation of the axial rod of the mechanical steering assembly and prevent rotation of the piston of the damping cylinder assembly via the connection between the mechanical steering assembly and the piston, the damping cylinder assembly including a singular hose extending between two openings on opposing sides of a central disk of the piston and configured to damp vibrations of the damped steering system during use;

FIG. 18 is a top perspective view of the damped steering system of FIG. 17, showing the damping cylinder assembly, the mechanical steering assembly, the anti-rotation features connected to the damping cylinder assembly and the mechanical steering assembly, and the singular hose extending between two openings on opposing sides of the central disk of the piston; and FIG. 19 is a top cross-sectional view of the damped steering system of FIG. 17 taken along line 19-19 of FIG. 18, showing the hollow cylinder and piston of the damping cylinder assembly, and showing portions of the singular hose extending between two openings on opposing sides of the central disk of the piston and into the hollow cylinder.

DETAILED DESCRIPTION

A first embodiment of a hydraulic steering system 10 for a vehicle in accordance with the present disclosure is shown in FIGS. 1-9. A second embodiment of the hydraulic steering system 10 is shown in FIG. 10. A method 200 of controlling the steering of a vehicle is shown in FIG. 11. A second embodiment of a hydraulic-assisted steering system 310 for a vehicle in accordance with an additional aspect of the present disclosure is shown in FIGS. 12-16. A third embodiment of a damped steering system 410 for a vehicle in accordance with an additional aspect of the present disclosure is shown in FIGS. 17-19.

The hydraulic steering system 10 includes a steering control 20 configured to receive a user input in order to control steering of the vehicle. The hydraulic steering system 10 includes a hydraulic steering cylinder assembly 30 including a housing 32, a cylinder 40 arranged within the housing 32 and extending axially, the cylinder 40 defining a hollow interior space. The hydraulic steering cylinder assembly 30 further includes a piston 50 slidably arranged within the hollow interior space of the cylinder 40 such that the piston 50 is configured to move axially within the cylinder 40.

The hydraulic steering system 10 further includes a steering assembly 60 including a first tie rod 62 connected to a first axial end 54 of the piston 50 and a second tie rod 64 connected to a second axial end 56 of the piston 50 opposite the first axial end 54. The hydraulic steering system 10 further includes a fluid supply system 70 operably connected to the steering control 20 and to the hydraulic steering cylinder assembly 30. The fluid supply system 70, which includes a hydraulic metering valve 72, is configured to control flow of a hydraulic fluid to the hydraulic steering cylinder assembly 30, which in turn will move the piston 50 therein to turn the wheels 108, 110 of the vehicle.

The hydraulic steering system 10 further includes an anti-rotation feature 80 coupled to the housing 32 of the hydraulic steering cylinder assembly 30 and operably connected to the piston 50. The anti-rotation feature 80 is configured to prevent rotation of the piston 50 via the connection to the piston 50. The prevention of the rotation of the piston 50 maintains the steering geometry of the steering system 10 consistent and eliminates binding at ball joints, which may be used at the connections between the tie rods 62, 64 and the piston 50.

In the illustrative embodiment, the hydraulic steering system 10 includes the steering control 20, the hydraulic steering cylinder assembly 30, the steering assembly 60, the fluid supply system 70, and the anti-rotation feature 80, as shown in FIGS. 1-10. The hydraulic steering system 10 is configured as a power steering system to control steering of a vehicle, specifically vehicles requiring additional steering force such as vehicles having large wheels and irregular suspensions. Such vehicles may include all-terrain vehicles (ATV) and utility-terrain vehicles (UTV). In addition to many ATV's and UTV's having large wheels, these vehicles may be outfitted with lift kits that an end user may utilize to raise the suspension of the vehicle to a higher angle. Traditional rack and pinion steering systems have proven to be inadequate for such applications in which the vehicle suspension is raised, in particular due to certain areas of the design being too weak to handle the forces applied to this type of wheel and steering assembly. The hydraulic steering system 10 described herein may be advantageously utilized for such vehicles, in particular for raised, high-angle suspensions.

Figure 3:
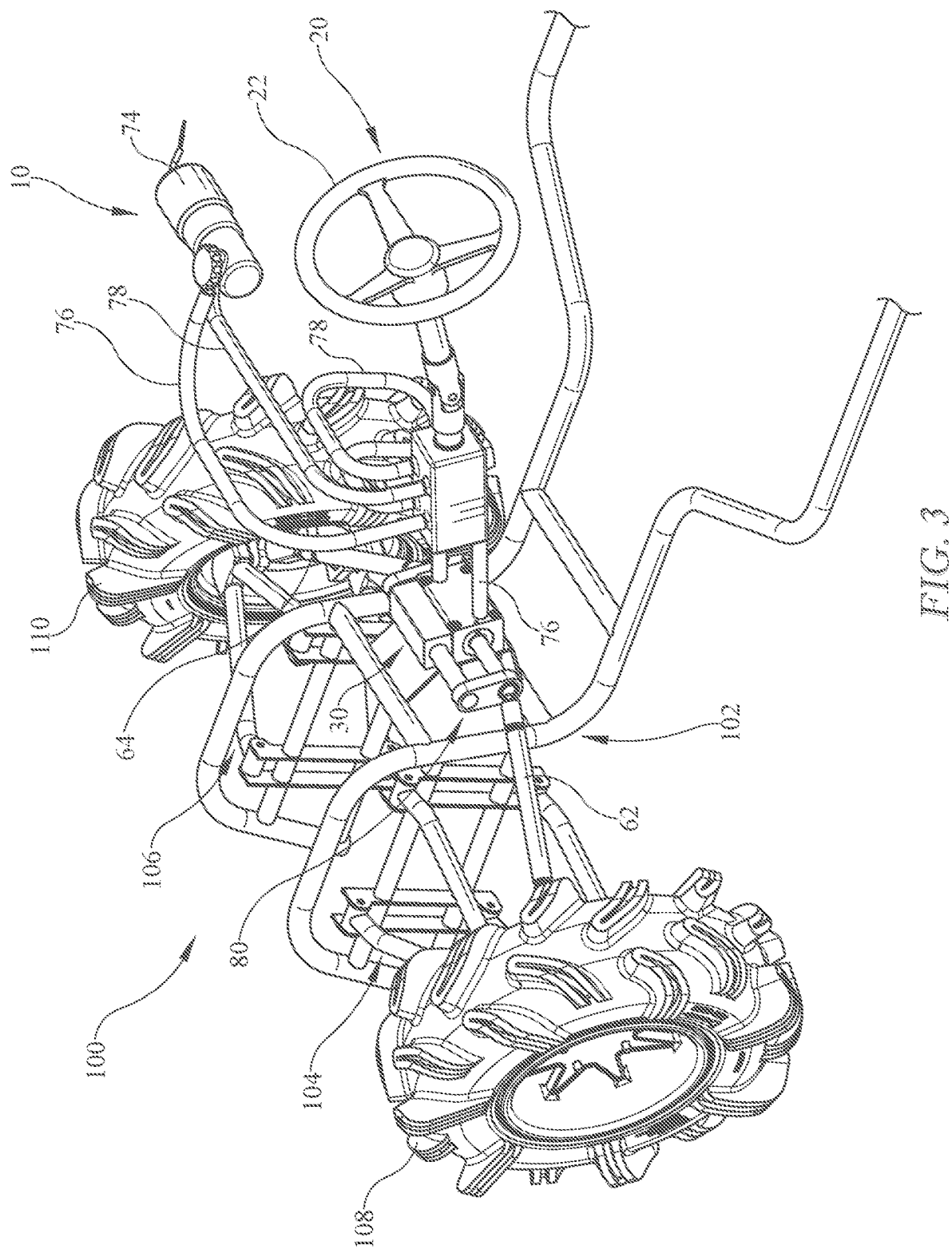
FIG. 3 is a perspective view of the hydraulic steering system of FIG. 1, showing the hydraulic steering system and a vehicle chassis of the vehicle.

The hydraulic steering system 10 may be utilized on the of a vehicle having a vehicle chassis 100, as shown in FIG. 3. The vehicle chassis 100 may be configured as an ATV or UTV vehicle chassis 100, having a central support section 102 in the front of the vehicle and wheel arms 104, 106 extending axially away from the central support section 102 that support the wheels 108, 110 of the vehicle. In the illustrative embodiment, the hydraulic steering system 10 is arranged on a side of the central support section 102, as shown in FIGS. 3-10, such that the hydraulic steering cylinder assembly 30 is located away from dangerous outside elements such as mud, water, and debris that may be present during operation of the vehicle.

Figure 2:
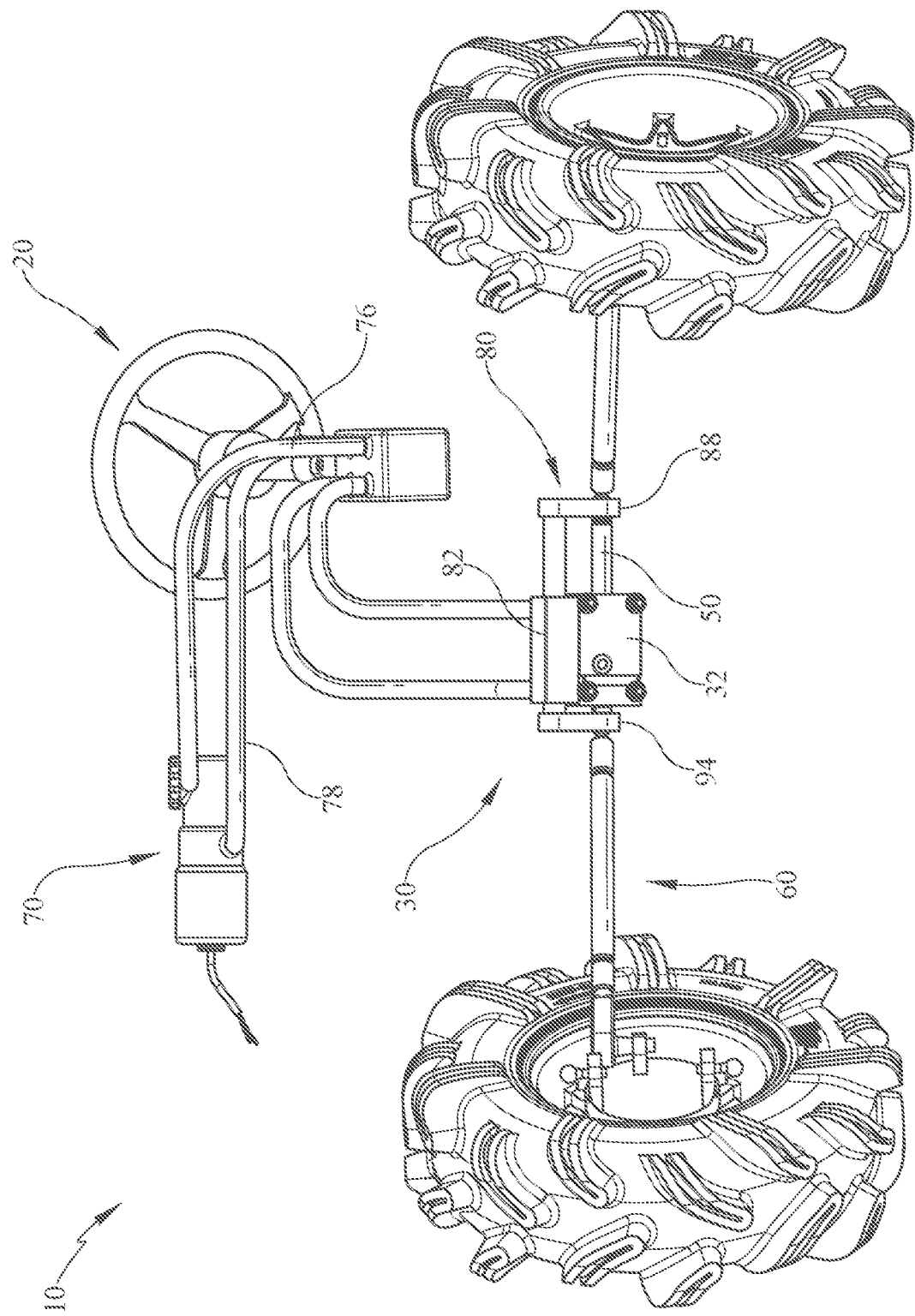
FIG. 2 is a top-down view of the hydraulic steering system of FIG. 1, showing the hydraulic steering cylinder assembly and the anti-rotation features.

The steering control 20 of the hydraulic steering system 10 may include a steering wheel 22, as shown in FIGS. 1-3. The steering control 20 includes a steering column 24 that extends from the steering wheel 22 to a hydraulic metering valve 72 of the fluid supply system 70, which will be described in greater detail below. The hydraulic metering valve 72 is operably connected to the hydraulic steering cylinder assembly 30. A user turning the steering wheel 22 to a first position causes the hydraulic metering valve 72 to control flow of a hydraulic fluid to the hydraulic steering cylinder assembly 30, which in turn will move the piston 50 therein to turn the wheels 108, 110 of the vehicle.

The hydraulic steering cylinder assembly 30 includes a housing 32, a cylinder 40, and a piston 50, as shown in detail in FIGS. 4-7. The housing 32 may be formed as a hollow box structure which is sized to fit the hollow cylinder 40 and piston 50 therein. The housing 32 includes a first axially facing side 33 and a second axially facing side 34 through which the piston 50 extends. The axial movement of the piston 50 is delimited by the central disk 58 of the piston 50, and the anti-rotation arms 88, 94 of the anti-rotation feature 80 may act as a backup delimiter of the movement of the piston 50. As such, the first and second axial ends 54, 56 of the piston 50 never enter the interior of the housing 32. The housing 32 may include attachment features 36 configured to attach the housing 32 to the chassis 100. The housing 32 also includes hydraulic fluid hose connection holes 38 for attachment of the hydraulic hoses 76, 78 of the fluid supply system 70.

The cylinder 40 of the hydraulic steering cylinder assembly 30 defines a hollow interior space within which the piston 50 is slidably arranged for axial movement, as shown in FIGS. 6 and 7. The cylinder 40 extends axially within the housing 32 and is located towards the center of the housing 32. In the illustrative embodiment, the cylinder 40 does not extend to the first and second axially facing sides 33, 34 of the housing 32 such that only the piston 50 extends out of the housing 32. The cylinder 40 has a central section 42 and symmetrical outer sections 44, 46. The central section 42 has a larger diameter than the diameter of the outer sections 44, 46.

The piston 50 is located within the cylinder 40 and extends axially therein, as shown in detail in FIG. 6. The piston 50 includes a piston body 52, first and second axial ends 54, 56, and a central disk 58. In the illustrative embodiment, the piston body 52 is a cylinder having a circular cross-section, although other cross-sectional shapes may be utilized in other embodiments. The diameter of the piston body 52 is sized to be smaller than the diameter of the central section 42 of the cylinder 40 and nearly equal to the diameter of the outer sections 44, 46, as can be seen in FIG. 6. Seals such as O-ring seals may be utilized at the ends to prevent fluid leakage. Accordingly, the outer sections 44, 46 provide the majority of the guidance of the axial movement of the piston 50. The diameter of the central disk 58 is nearly equal to the diameter of the central section 42 of the cylinder 40 so as to create a fluid-tight seal between the central disk 58 and the inner walls of the cylinder 40. This allows for operation of the hydraulic steering system, which requires high pressure hydraulic fluid to be pumped onto one side of the central disk 58 in order to push the piston 50 in an axial direction, thus turning the wheels of the vehicle.

The steering assembly 60 of the hydraulic steering system 10 includes a first tie rod 62 connected to the first axial end 54 of the piston 50 and a second tie rod 64 connected to the second axial end 56 of the piston 50, as shown in FIGS. 1-6. First ends of the tie rods 62, 64 are connected to the wheels 108, 110 of the vehicle, and second ends of the tie rods 62, 64 are attached to the axial ends 54, 56 of the piston 50 via joints, in particular ball joints.

The anti-rotation feature 80 of the hydraulic steering system 10 is shown in detail in FIGS. 3-10. In the illustrative embodiment, the anti-rotation feature 80 includes a housing 82 that is coupled to the outside of the housing 32 of the hydraulic steering cylinder assembly 30, as shown in FIGS. 1-9. However, in alternative embodiments, as shown in FIG. 10, the housing 82 of the anti-rotation feature 80 is coupled to the chassis 100 of the vehicle. In further embodiments, the housing 82 may be coupled to both the chassis 100 and the hydraulic steering cylinder assembly 30.

The anti-rotation feature 80 is configured to prevent undesired rotation of the piston 50 within the cylinder 40. The prevention of the rotation of the piston 50 maintains the steering geometry of the steering system 10 consistent and eliminates binding at ball joints, which may be used at the connections between the tie rods 62, 64 and the piston 50. In the illustrative embodiment, the anti-rotation feature 80 includes the housing 82, an axial rod 84, and two anti-rotation arms 88, 94. The axial rod 84 is slidably arranged within the housing 82 such that the rod 84 protrudes from first and second axially facing sides 81, 83 of the housing 82. The axial rod 84 is free to move within the housing 82, as movement of the rod 84 is induced by the connection of the anti-rotation arms 88, 94 to the piston 50, as will be described in greater detail below.

In the illustrative embodiment, the anti-rotation feature 80 includes two anti-rotation arms 88, 94, as shown in FIGS. 1-5. The anti-rotation arms 88, 94 are fixedly coupled to both the axial rod 84 and the piston 50. In this arrangement, the piston 50 cannot rotate because the first ends 90, 96 of the anti-rotation arms 88, 94 are fixedly coupled to the axial rod 84 and the second ends 91, 97 of the anti-rotation arms 88, 94 are fixedly coupled to the piston 50.

Figure 4:
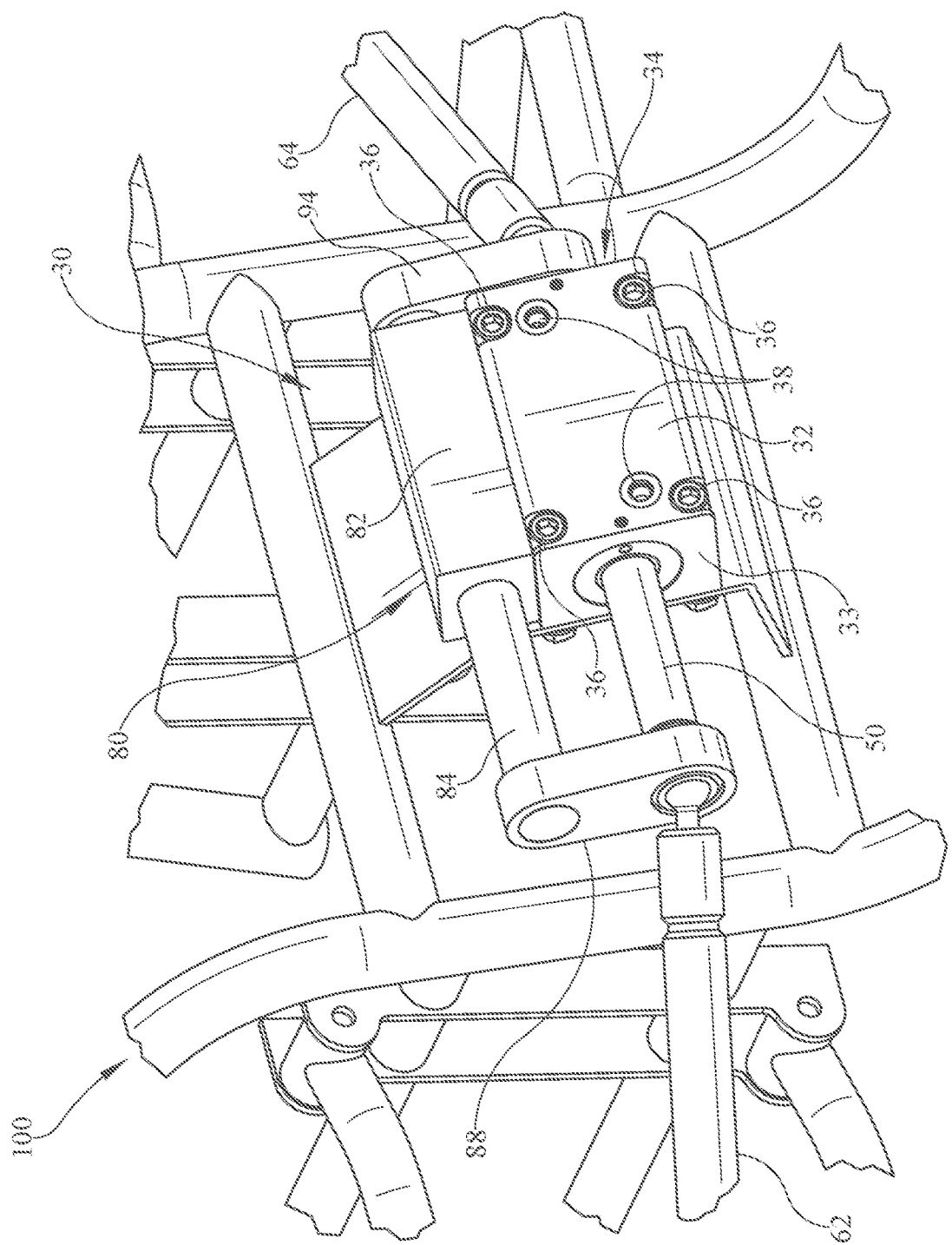
FIG. 4 is a perspective view of the hydraulic steering system of FIG. 1, showing the hydraulic steering cylinder assembly and the anti-rotation features coupled to the housing of the hydraulic steering cylinder assembly.
Figure 5:
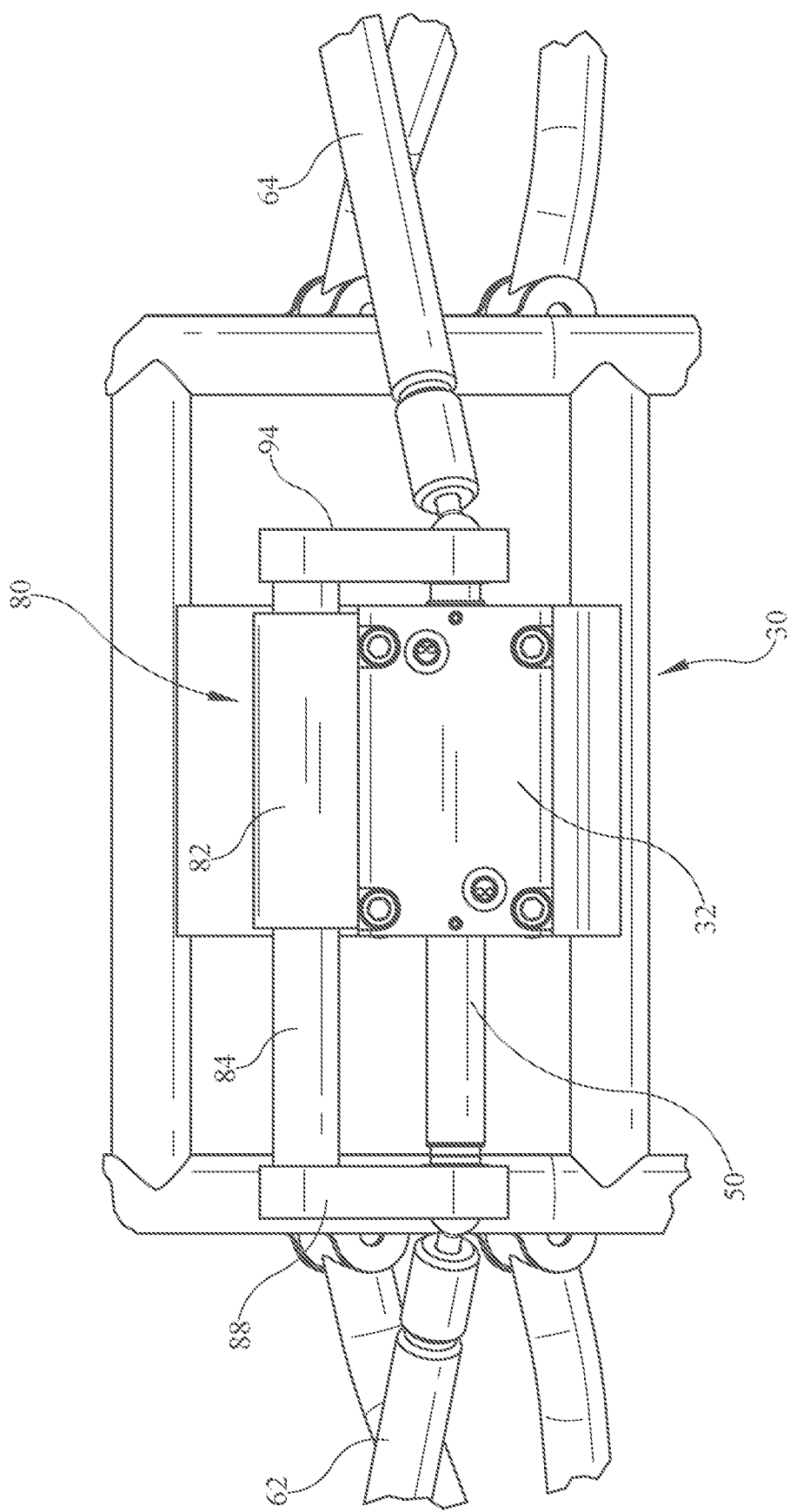
FIG. 5 is a top view of the hydraulic steering system of FIG. 1, showing the hydraulic steering cylinder assembly and the anti-rotation features coupled to the housing of the hydraulic steering cylinder assembly.

The axial rod 84 defines a first axial end 85 located generally adjacent to the first axial end 54 of the piston 50 and second axial end 86 located generally adjacent to the second axial end 56 of the piston 50, as shown in FIGS. 4-6. The first anti-rotation arm 88 is fixedly coupled to the first axial end 85 of the axial rod 84 and is fixedly coupled to the first axial end 54 of the piston 50. The first anti-rotation arm 88 includes an arm body 89 including the first end 90 and the second end 91. In the illustrative embodiment, the first end 90 of the arm body 89 includes an annular hole 92 through which the first axial end 85 of the axial rod 84 is fixedly inserted so as to prevent rotation of the axial rod 84 relative to the anti-rotation arm 88. The inside of the annular hole 92 may include any type of surface or feature to secure the anti-rotation arm 88 to the axial rod 84, such as teeth that engage with corresponding grooves in the axial rod 84, or an adhesive. The second end 91 of the arm body 89 includes an annular hole 93 through which the first axial end 54 of the piston 50 is fixedly inserted so as to prevent rotation of the piston 50 relative to the anti-rotation arm 88. The inside of the annular hole 93 may include any type of surface or feature to secure the anti-rotation arm 88 to the piston 50, such as teeth that engage with corresponding grooves in the piston 50, or an adhesive.

The second anti-rotation arm 94 is fixedly coupled to the second axial end 86 of the axial rod 84 and is fixedly coupled to the second axial end 56 of the piston 50. The second anti-rotation arm 94 includes an arm body 95 including the first end 96 and the second end 97. In the illustrative embodiment, the first end 96 of the arm body 95 includes an annular hole 98 through which the second axial end 86 of the axial rod 84 is fixedly inserted so as to prevent rotation of the axial rod 84 relative to the anti-rotation arm 94. The inside of the annular hole 98 may include any type of surface or feature to secure the anti-rotation arm 94 to the axial rod 84, such as teeth that engage with corresponding grooves in the axial rod 84, or an adhesive. The second end 97 of the arm body 95 includes an annular hole 99 through which the second axial end 56 of the piston 50 is fixedly inserted so as to prevent rotation of the piston 50 relative to the anti-rotation arm 94. The inside of the annular hole 99 may include any type of surface or feature to secure the anti-rotation arm 94 to the piston 50, such as teeth that engage with corresponding grooves in the piston 50, or an adhesive.

The anti-rotation arms 88, 94 may be attached to the piston 50 and axial rod 84 utilizing alternative attachment methods. For example, in some embodiments, the anti-rotation arms 88, 94 may include a single, straight body that is inserted into a corresponding hole in the axial rod 84 and a corresponding hole in the piston 50 such that the anti-rotation arms 88, 94 extend perpendicularly relative to the outer surfaces of the axial rod 84 and the piston 50. In other embodiments, the anti-rotation arms 88, 94 may be formed as rigid sleeves that extend around the outer surfaces of the axial rod 84 and the piston 50. The inner surfaces of the rigid sleeves of the anti-rotation arms 88, 94 may include teeth, adhesive, or other similar fastening means to secure the anti-rotation arms 88, 94 to the axial rod 84 and the piston 50 so as to prevent rotation of the piston 50.

In the illustrative embodiment, the axial movement of the axial rod 84 and the piston 50 is delimited by the central disk 58 of the piston. The first and second anti-rotation arms 88, 94 may act as backup delimiters, as each anti-rotation arm 88, 94 may engage the corresponding axially facing side 33, 34 of the housing 32 in the event of a defect in the central disk 58 or piston 50. For example, as shown in FIG. 6, the piston 50 is moved the entire axial direction to the left of the housing 32 such that the central disk 58 contacts the inner axial end of the central section 42 of the cylinder 40.

In alternative embodiments, the anti-rotation feature 80 may include only a single anti-rotation arm 88, or more than two anti-rotation arms. In such an embodiment including only a single anti-rotation arm 88, the ends of the piston 50 and the axial rod 84 opposite the ends having the single anti-rotation arm 88 may include a stopper configured to engage with and contact the side of the housing 32 as a backup delimiter of the axial movement of the piston 50 in addition to the central disk 58.

The fluid supply system 70 includes a hydraulic metering valve 72, a pump 74, and hydraulic hoses 76, 78, as shown in FIGS. 1-3 and 9. The hydraulic metering valve 72 is operably connected to the steering control 20, in particular the steering column 24 of the steering wheel 22, and to the pump 74, which is a hydraulic pump. The hydraulic metering valve 72 is configured to direct high pressure hydraulic fluid from the pump 74 to the central section 42 of the cylinder 40 of the hydraulic steering cylinder assembly 30 and configured to direct fluid away from the central section 42 of the cylinder 40.

In operation, the hydraulic steering system 10 is configured to turn the wheels 108, 110 of the vehicle in response to the user turning the steering wheel 22 via the fluid supply system 70 pumping hydraulic fluid into the hydraulic steering cylinder assembly 30. For example, in response to the steering wheel 22 being turned in a counterclockwise direction to a first predetermined position, the hydraulic metering valve 72 is configured to direct hydraulic fluid to a right-most portion of the central section 42 of the cylinder 40 and to remove fluid from a left-most portion of the central section 42 such that the piston 50 is forced to move to the left in the axial direction. Conversely, in response to the steering wheel 22 being turned in a clockwise direction to a second predetermined position, the hydraulic metering valve 72 is configured to direct hydraulic fluid to a left-most portion of the central section 42 of the cylinder 40 and to remove fluid from a right-most portion of the central section 42 such that the piston 50 is forced to move to the right in the axial direction. The pumping of the hydraulic fluid to and from the cylinder 40 is carried out via the hydraulic hoses 76, 78 of the fluid supply system 70. As the steering position of the steering wheel 22 is increased or decreased in the clockwise and counterclockwise directions, the amount of fluid supplied and removed from the cylinder 40 is adjusted accordingly such that the steering angle of the wheels 108, 110 corresponds to the position of the steering wheel 22.

A method 200 of controlling steering of a vehicle is disclosed herein, as shown in FIG. 11. The method 200 includes a first operation 202 of receiving a predetermined position of a steering control of the vehicle, the vehicle including a steering system including a steering assist assembly having an axially movable piston arranged in an axially extending first cylinder located within a housing of the steering assist assembly, the steering assist assembly further including an axially movable axial rod slidably arranged within an axially extending second cylinder located within the housing, the steering assist assembly further including a first tie rod connected to a first axial end of the axial rod and a second tie rod connected to a second axial end of the axial rod opposite the first axial end.

The method 200 includes a second operation 204 of moving the axial rod based on the predetermined position of the steering wheel via rotation of a shaft operably connected to the steering control and configured to engage the axial rod so as to axially move the axial rod, the rotation of the shaft causing the axial rod to axially move and arrange the axial rod in a first axial position that corresponds to the predetermined position of the steering control, wherein axial movement of the axial rod at least partially causes the first and second tie rods to axially move. The method 200 includes a third operation 206 of supplying and removing fluid to and from a hollow interior space defined within the first cylinder based on the predetermined position of the steering control via a fluid supply system operably connected to the steering control and to the steering assist assembly in order to control axial movement of the piston and arrange the piston in a first axial position that corresponds to the predetermined position of the steering control, wherein axial movement of the piston at least partially causes the first and second tie rods to axially move along with the axial movement of the axial rod. The steering system includes at least one anti-rotation arm operably connected to the piston and to the axial rod, the at least one anti-rotation feature configured to prevent rotation of the piston and the axial rod.

Another embodiment of a steering assembly of the present disclosure, in particular a hydraulic-assisted steering system 310, is shown in FIGS. 12-16. The hydraulic-assisted steering system 310 is substantially similar to the hydraulic steering system 10 described herein. Accordingly, similar reference numbers in the 300 series indicate features that are common between the hydraulic-assisted steering system 310 and the hydraulic steering system 10. The descriptions of the hydraulic steering system 10 are incorporated by reference to apply to the hydraulic-assisted steering system 310, except in instances when it conflicts with the specific description and the drawings of the hydraulic-assisted steering system 310.

The hydraulic-assisted steering system 310 and its components are formed substantially similarly to the hydraulic steering system 10, and are configured to be utilized on a vehicle chassis 100 having the central support section 102, wheel arms 104, 106, and wheels 108, 110, as shown in FIGS. 12-16. Unlike the hydraulic steering system 10, which is fully hydraulically controlled, the hydraulic-assisted steering system 310 is only partially assisted by hydraulics, and also includes a mechanical steering assembly 360 alongside a hydraulic-assisted steering cylinder assembly 330. The hydraulic-assisted steering system 310 includes a steering control 320 configured to receive a user input in order to control steering of the vehicle. The hydraulic-assisted steering system 310 also includes a housing 328 that houses both the hydraulic-assisted steering cylinder assembly 330 and the mechanical steering assembly 360.

The hydraulic-assisted steering cylinder assembly 330 includes a first cylinder 340 formed within the housing 328 and extending axially, the first cylinder 340 defining a hollow interior space. The hydraulic-assisted steering cylinder assembly 330 further includes a piston 350 slidably arranged within the hollow interior space of the first cylinder 340 such that the piston 350 is configured to move axially within the cylinder 340. Similarly, the mechanical steering assembly 360 includes a second cylinder 381 formed within the housing 328 and extending axially, the second cylinder 381 defining a hollow interior space. The mechanical steering assembly 360 further includes an axial rod 384, which may be a rack of a rack and pinion steering setup, slidably arranged within the hollow interior space of the second cylinder 381 such that the axial rod 384 is configured to move axially within the cylinder 381. As will be described in greater detail below, the hydraulic-assisted steering system 310 further includes two anti-rotation arms 388, 394 that are operably connected to both the axial rod 384 and the piston 350 so as to prevent rotation of the piston 350 and the axial rod 384. In particular, the anti-rotation arms 388, 394 prevent the axial rod 384 from rotating such that the teeth 384T consistently interact with the teeth 366T of the shaft 366 and such that the tie rods 362, 364 remain aligned.

The steering control 320 of the hydraulic-assisted steering system 310 may include a steering wheel 322, as shown in FIG. 12. The steering control 320 includes a steering column 324 that extends from the steering wheel 322 to a hydraulic metering valve 372 of a fluid supply system 370. The hydraulic metering valve 372 is operably connected to the hydraulic-assisted steering cylinder assembly 330. A user turning the steering wheel 322 to a first position causes the hydraulic metering valve 372 to control flow of a hydraulic fluid to the hydraulic-assisted steering cylinder assembly 330, which in turn will move the piston 350 therein to assist in turning the wheels 108, 110 of the vehicle. The remainder of the force required to turn the wheels 108, 110 is produced by the mechanical steering assembly 360, which will be described in greater detail below.

The axial movement of the piston 350 is delimited by the central disk 358 of the piston 50, and the anti-rotation arms 388, 394 of the anti-rotation feature 380 may act as backup delimiters of the axial movement of the piston 50. The housing 328 also includes hydraulic fluid hose connection holes 338 for attachment of the hydraulic hoses 376, 378 of the fluid supply system 370. Similar to the fluid supply system 70, the fluid supply system 370 includes the hydraulic metering valve 372, a pump 374, and hydraulic hoses 376, 378. Based on the steering direction of the steering wheel 322, the hydraulic metering valve 372 is configured to direct and remove high pressure hydraulic fluid to and from the first cylinder 340 so as to move the piston 350, and in turn move the tie rods 362, 364 via the anti-rotation arms 388, 394 to turn the wheels 108, 110.

The first cylinder 340 defines a hollow interior space within which the piston 350 is slidably arranged for axial movement, as shown in FIGS. 13 and 14. The cylinder 340 extends axially within the housing 328 and is located towards a rearward side of the housing 328 relative to the length of the vehicle. In the illustrative embodiment, the cylinder 340 includes plugs 341, 342 that enclose the interior space of the cylinder 340 such that the hydraulic fluid cannot escape the cylinder 340.

The piston 350 is located within the first cylinder 340 and extends axially therein, as shown in detail in FIG. 14. The piston 350 includes first and second axial ends 352, 354, and a central disk 358. In the illustrative embodiment, the diameter of the central disk 358 is nearly equal to the diameter of the first cylinder 340 so as to create a fluid-tight seal between the central disk 358 and the inner wall of the cylinder 340. This allows for operation of the hydraulic-assisted steering, which requires high pressure hydraulic fluid to be pumped onto one side of the central disk 358 in order to push the piston 350 in an axial direction, thus turning the wheels of the vehicle.

The piston 350 further includes attachment members 353, 355 located at each axial end 352, 354 of the piston 350, as shown in FIGS. 13, 14, and 16. Each attachment member 353, 355 is configured to engage with a ball bearing 391, 397 arranged within and supported by the attachment arms 388, 394. As shown in FIGS. 14 and 16, each attachment member 353, 355 includes a circular shape so as to surround the ball bearing 391, 397, as well as a contoured inner opening that matches the outer contour of the ball bearings 391, 397 such that the attachment member 353, 355 may flushly rotate around the ball bearings 391, 397 based on the movement of the piston 350, the axial rod 384, and the tie rods 362, 364.

In addition to the force provided to move the wheels 108, 110 by the hydraulic-assisted steering cylinder assembly 330, additional force to move the wheels 108, 110 is provided by the mechanical steering assembly 360. The mechanical steering assembly 360 includes the axial rod 384 that moves axially within the second cylinder 381. The second cylinder 381 is located forward of the first cylinder 340 and is entirely spaced apart and separate from the first cylinder 340. The axial rod 384 includes a first axial end 384E and a second axial end 385E, as shown in FIG. 16. Each axial end 384E, 385E includes attachment members 384B and 385B each configured to engage with a ball bearing 386, 387 arranged within and supported by ball bearing support members 363, 365 of the tie rods 362, 364. Each ball bearing support member 363, 365 includes a ball bearing opening 363SO, 365SO that matches the outer contour of the ball bearings 386, 387 such that the ball bearing support members 363, 365 may flushly rotate around the ball bearings 386, 387. The tie rods 362, 364 are connected to the wheels 108, 110 of the vehicle such that axial movement of the axial rod 384 and the piston 350 turns the wheels 108, 110. In the illustrated embodiment, the second cylinder 381 includes enlarged axial end cavities 382, 383 that are sized to surround the attachment members 384B and 385B when the axial rod 384 moves fully in either axial direction.

The mechanical steering assembly 360 further includes a shaft 366, as shown in FIGS. 13, 15, and 16. As can be seen in FIG. 13, the steering column 324 extends into the housing of the hydraulic metering valve 372 and is operably connected to the shaft 366, which extends away from the metering valve 372 and to the axial rod 384. In some embodiments, the steering column 324 may be integrally formed with the shaft 366, but may be connected to the shaft 366 via a rotatable joint. The shaft 366 extends downwardly and through an opening 368 formed in the housing 328. The shaft 366 includes a terminal end having spiral teeth 366T formed thereon, and may be formed as a pinion of a rack and pinion setup. The teeth 366T are configured to interact with corresponding teeth 384T formed on an outer surface of the axial rod 384 in an engagement area 367. The teeth 384T of the axial rod 384 may be formed on the top of the rod 384 and extend around an outer surface of the rod 384 toward the rear of the rod 384 in the view shown in FIG. 15. Because the shaft 366 is angled as shown in FIG. 12, this positioning of the teeth 384T on the axial rod 384 provides for optimal interaction of the teeth 366T of the shaft 366 with the teeth 384T. The interaction between the teeth 366T, 384T may function similar to a rack and pinion setup, in particular in that the rotation of the shaft 366 and the teeth 366T engage the teeth 384T so as to move the axial rod 384 in both axial directions, thus in turn moving the tie rods 362, 364 and turning the wheels 108, 110.

As described above, the anti-rotation arms 388, 394 are operably connected to both the axial rod 384 and the piston 350. In this arrangement, the piston 350 and the axial rod 384 cannot rotate due to the connection between the arms 388, 394 and these components. In the illustrative embodiment, each anti-rotation arm 388, 394 includes a cantilevered extension 389, 395 that is coupled to a side surface of the attachment members 384B, 385B and extends away from the attachment member 384B, 385B. Each cantilevered extension 389, 395 includes an upper and lower extension arms 389U, 389L, 395U, 395L that define an opening 3890, 3950 therebetween in which the corresponding attachment member 353, 355 is arranged.

Each ball bearing 391, 397 is also arranged in the opening 3890, 3950 such that the attachment member 353, 355 can engage with the respective ball bearing 391, 397. A fastening member 390, 396 may extend through and couple the ball bearing 391, 397 to the cantilevered extension 389, 395. The fastening member 390, 396, which may be a screw, nut and bolt, or the like, may extend from the upper extension arm to the lower extension arms 389U, 389L, 395U, 395L. In the illustrative embodiment, the hydraulic metering valve 372 is configured to supply and remove hydraulic fluid to the cylinder 340 such that rate of axial movement of the piston 350 matches the rate of axial movement of the axial rod 384 as controlled by the steering wheel 322 and shaft 366. Thus, because the rate of movement of the piston 350 and the axial rod 384 is equal, the attachment members 353, 355 will not significantly rotate relative to the cantilevered extensions 389, 395.

In operation, a user rotates the steering wheel 322 in a first direction. This rotation will, simultaneously, move the piston 350 and the axial rod 384 in a first axial direction corresponding to the first direction so as to move the tie rods 362, 364 in the first axial direction, which consequently turns the wheels 108, 110. In particular, the rotation of the steering wheel 322 rotates the shaft 366, which causes the teeth 366T to interact with the teeth 384T of the axial rod 384 so as to move the axial rod 384 in the first axial direction. Simultaneously, the rotation of the steering wheel 322 causes the hydraulic metering valve 372 to regulate fluid flow to the cylinder 340 so as to move the piston 350 in the first axial direction the same distance and at the same rate as the axial rod 384. As such, the combined force supplied by the movement of the axial rod 384 and the piston 350 will move the tie rods 362, 364 in the axial direction, thus turning the wheels 108, 110. While this process is occurring, the anti-rotation arms 388, 394 will prevent any undesired rotation of the piston 350 and the axial rod 384 from occurring.

Another embodiment of a steering assembly of the present disclosure, in particular a damped steering system 410, is shown in FIGS. 17-19. The damped steering system 410 is substantially similar to the hydraulic-assisted steering system 310 and the hydraulic steering system 10 described herein. Accordingly, similar reference numbers in the 400 series indicate features that are common between the damped steering system 410 and the hydraulic-assisted steering system 310 and the hydraulic steering system 10. The descriptions of the hydraulic-assisted steering system 310 and the hydraulic steering system 10 are incorporated by reference to apply to the damped steering system 410, except in instances when it conflicts with the specific description and the drawings of the damped steering system 410.

As can be seen in FIGS. 17-19, the damped steering system 410 includes substantially similar components as the hydraulic-assisted steering system 310 of FIGS. 12-16, and is configured to be utilized on a vehicle chassis 100 having the central support section 102, wheel arms 104, 106, and wheels 108, 110. Unlike the hydraulic-assisted steering system 310, which is partially assisted by hydraulics and also includes the mechanical steering assembly 360 alongside the hydraulic-assisted steering cylinder assembly 330, the damped steering system 410 is entirely controlled by a mechanical steering assembly 460, while the damping steering cylinder assembly 430 provides a damping effect to mitigate vibrations during turning of the vehicle. As such, the damped steering system 410 does not include a fluid supply system, as can be seen in FIG. 17.

In the illustrative embodiment, the damped steering system 410 includes a steering control 420 configured to receive a user input in order to control steering of the vehicle. The damped steering system 410 also includes a housing 428 that houses both the damping steering cylinder assembly 430 and the mechanical steering assembly 460. Each of the damping steering cylinder assembly 430 and the mechanical steering assembly 460 are formed substantially similarly to the hydraulic-assisted steering cylinder assembly 330 and the mechanical steering assembly 360 of the embodiment described above, in particular to include a piston 450 and axial rod 484 that move axially to move the tie rods 462, 464. The system 410 also includes anti-rotation arms 488, 494 that prevent undesired rotation of the piston 450 and rod 484, each being formed substantially similarly to the anti-rotation arms 388, 394 described above. In particular, the anti-rotation arms 488, 494 prevent the axial rod 484 from rotating such that the teeth (not shown due to view, formed similarly to teeth 384T) consistently interact with the teeth (not shown due to view, formed similarly to teeth 366T) of the shaft 466 and such that the tie rods 462, 464 remain aligned.

Because the system 410 does not include a hydraulically controlled fluid supply system and hydraulic steering assembly, the movement of the tie rods 462, 464 via the attachment members 463, 465 is entirely mechanical, being governed solely by rotation of the shaft 466. Similar to the mechanical steering assembly 360, the rotation of the shaft 466 rotates the teeth (not shown) formed thereon, which in turn engages teeth (not shown) formed of the axial rod 484 so as to axially move the axial rod 484. As can be seen in FIG. 17, the shaft 466 attaches directly to the steering column 424 such that rotation of the steering wheel 422 directly causes rotation of the shaft 466.

Also unlike the system 310, the system 410 includes a singular hydraulic hose 476, also referred to as a fluidic connection component, that interconnects two hydraulic fluid hose connection holes 438, as shown in FIGS. 17-19. As can be seen in greater detail in FIG. 19, each connection hole 438 is formed at axial ends of the first cylinder 440 near the plugs 441, 442. The central disk 458 is arranged centrally along the piston 450 and between the two connection holes 438. The first cylinder 440 is at least partially filled with hydraulic fluid such that, in operation, the singular hose 476 acts to damp vibrations that may occur during axial movement of the axial rod 484 and turning of the wheels 108, 110. In particular, the axial movement of the axial rod 484 will cause the piston 450 to move in the same axial direction via the anti-rotation arms 488, 494. The axial movement of the piston 450 causes the hydraulic fluid flowing from one side of the interior space of the cylinder 440 on one side of the central disk 458 to the other side of the central disk 458 via the singular hose 476. This flow of the hydraulic fluid during axial movement of the piston 450 will aid in damping vibrations caused by the movement of the components and the wheels 108, 110 during a turn of the vehicle.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A steering system for a vehicle, comprising:
   a steering control configured to receive user input in order to control turning of wheels of the vehicle;
   a steering assist assembly operably connected to the steering control and including:
      a housing having a first axially facing side and a second axially facing side located opposite the first axially facing side, the housing including a first cylinder formed therein and extending axially and opening at the first and second axially facing sides, the first cylinder defining a hollow interior space, the housing including a second cylinder formed therein and spaced apart from the first cylinder, the second cylinder extending axially and opening at the first and second axially facing sides;
      a piston slidably arranged within the first cylinder such that the piston is configured to move axially within the first cylinder;
      an axial rod slidably arranged within the second cylinder such that the axial rod is configured to move axially within the second cylinder;
      a first tie rod connected to a first axial end of the axial rod and a second tie rod connected to a second axial end of the axial rod opposite the first axial end;
      a shaft operably connected to the steering control and configured to rotate therewith, the shaft configured to engage with the axial rod such that rotation of the shaft causes axial movement of the axial rod, the axial movement of the axial rod causing axial movement of the first and second tie rods so as to turn the wheels of the vehicle; and
   at least one anti-rotation arm operably connected to the piston and to the axial rod, the at least one anti-rotation feature configured to prevent rotation of the piston and the axial rod.

2. The steering system of claim 1, wherein the at least one anti-rotation arm includes a first anti-rotation arm and a second anti-rotation arm, wherein a first end of the first anti-rotation arm is operably connected to a first axial end of the piston and a second end of the first anti-rotation arm is operably connected to the first axial end of the axial rod, and wherein a first end of the second anti-rotation arm is operably connected to a second axial end of the piston opposite the first axial end, and a second end of the second anti-rotation arm is operably connected to the second axial end of the axial rod.

3. The steering system of claim 2, wherein the first axial end of the axial rod is located generally adjacent to the first axial end of the piston, and wherein the second axial end of the axial rod is located generally adjacent to the second axial end of the piston.

4. The steering system of claim 3, wherein the axial rod includes first and second attachment members arranged at the first and second axial ends of the axial rod and configured to operably connect the axial rod to the first and second tie rods, respectively, wherein each of the first anti-rotation arm and the second anti-rotation arm includes a cantilevered extension that is coupled to a side surface of the first and second attachment members, respectively, and wherein the cantilevered extension of each of the first and second anti-rotation arms includes an upper extension arm and a lower extension arm spaced apart from and formed substantially parallel to the upper extension arm.

5. The steering system of claim 4, wherein the piston includes third and fourth attachment members arranged at the first and second axial ends of the piston and configured to operably connect the piston to terminal ends of the upper and lower extension arms located at opposite ends of the upper and lower extension arms that are coupled to the first and second attachment members.

6. The steering system of claim 5, wherein the first and second anti-rotation arms each further include a spherical bearing arranged between the upper and lower extension arms, and wherein the third and fourth attachment members are configured to surround and engage the spherical bearing of a respective anti-rotation arm of the first and second anti-rotation arms.

7. The steering system of claim 3, wherein the housing further includes a first connection hole and a second connection hole spaced apart from the first connection hole, each of the first and second connection holes being formed through an outer surface of the housing and extending into the hollow interior space of the cylinder, wherein the first connection hole extends into a first portion of the first cylinder and the second connection hole extends into a second portion of the first cylinder, the first and second portions of the hollow interior space being defined by a central disk of the piston that circumferentially contacts an inner surface of the first cylinder so as to fluidically seal the first portion from the second portion, wherein a first plug closes a first axial end opening of the first cylinder adjacent the first portion and a second plug closes a second axial end opening of the first cylinder adjacent the second portion, and wherein the first and second portions are at least partially filled with fluid.

8. The steering system of claim 7, wherein the steering assist assembly further includes a fluidic connection component attached to the first and second connection holes, the fluidic connection component fluidically connecting the first portion to the second portion of the hollow interior space of the first cylinder, and wherein axial movement of the piston causes the fluid to flow from one of the first and second portions to the other of the first and second portions via the fluidic connection component, the flow of the fluid configured to damp vibrations caused by movement of the piston and the axial rod within the first and second cylinders and caused by movement of the vehicle.

9. The steering system of claim 1, further comprising:
a fluid supply system operably connected to the steering control and to the steering assist assembly, the fluid supply system configured to supply and remove fluid from the hollow interior space of the first cylinder so as to partially control axial movement of the piston along with axial movement of the axial rod caused by rotation of the shaft,
wherein the fluid supply system includes a hydraulic metering valve and a pump, wherein the hydraulic metering valve is operably connected to the steering control and to the pump, and wherein the hydraulic metering valve is configured to direct fluid from the pump to a first portion of the hollow interior space of the first cylinder and configured to direct fluid away from a second portion of the hollow interior space of the first cylinder, the first and second portions of the hollow interior space being defined by a central disk of the piston that circumferentially contacts an inner surface of the first cylinder so as to fluidically seal the first portion from the second portion.

10. The steering system of claim 9, wherein the hydraulic metering valve is configured to direct fluid from the pump to the first portion of the hollow interior space of the cylinder and configured to direct fluid away from a second portion of the hollow interior space of the cylinder in response to the steering control being in a predetermined position such that the axial movement of the piston corresponds to the axial movement of the axial rod caused by rotation of the shaft.

11. The steering system of claim 10, wherein the steering control is a steering wheel, wherein the steering wheel being turned in a counterclockwise direction to a first predetermined position causes (i) the shaft to rotate and engage with the axial rod so as to move the axial rod in a first axial direction a first predetermined distance, and (ii) the hydraulic metering valve to direct fluid to and remove fluid from the hollow interior space such that the piston moves the first predetermined distance in the first axial direction, and wherein the steering wheel being turned in a clockwise direction to a second predetermined position causes (i) the shaft to rotate and engage with the axial rod so as to move the axial rod in a second axial direction a second predetermined distance, and (ii) the hydraulic metering valve to direct fluid to and remove fluid from the hollow interior space such that the piston moves the second predetermined distance in the second axial direction.

12. The steering system of claim 9, wherein the shaft includes a plurality of first teeth located at a terminal end adjacent the axial rod, and wherein the axial rod includes a plurality of second teeth adjacent the plurality of first teeth such that engagement of the plurality of first teeth with the plurality of second teeth when the shaft rotates causes axial movement of the axial rod.

13. A vehicle, comprising:
a vehicle chassis;
a front wheel assembly coupled to the vehicle chassis and including a left wheel, a right wheel, a first tie rod operably connected to the left wheel, and a second tie rod operably connected to the right wheel; and
a steering system configured to steer the left wheel and the right wheel of the front wheel assembly, the steering system including:
a steering control configured to receive user input in order to control turning of wheels of the vehicle;
a steering assist assembly operably connected to the steering control and including:
a housing;
a piston slidably arranged within the housing and configured to move axially within the housing;
an axial rod slidably arranged within the housing and spaced apart from the piston, the axial rod configured to move axially within the housing, the first tie rod connected to a first axial end of the axial rod and the second tie rod connected to a second axial end of the axial rod opposite the first axial end;
a shaft operably connected to the steering control and configured to rotate therewith, the shaft configured to engage with the axial rod such that rotation of the shaft causes axial movement of the axial rod, the axial movement of the axial rod causing axial movement of the first and second tie rods so as to turn the left and right wheels of the vehicle; and
at least one anti-rotation arm operably connected to the piston and to the axial rod, the at least one anti-rotation feature configured to prevent rotation of the piston and the axial rod.

14. The vehicle of claim 13, wherein the housing includes a first axially facing side and a second axially facing side located opposite the first axially facing side, wherein the housing includes a first cylinder formed therein and extending axially and opening at the first and second axially facing sides, the first cylinder defining a hollow interior space in which the piston is slidably arranged, and wherein the housing includes a second cylinder formed therein and spaced apart from the first cylinder, the second cylinder extending axially and opening at the first and second axially facing sides, the second cylinder defining a hollow interior space in which the axial rod is slidably arranged.

15. The vehicle of claim 14, wherein the at least one anti-rotation arm includes a first anti-rotation arm and a second anti-rotation arm, wherein a first end of the first anti-rotation arm is operably connected to a first axial end of the piston and a second end of the first anti-rotation arm is operably connected to the first axial end of the axial rod, and wherein a first end of the second anti-rotation arm is operably connected to a second axial end of the piston opposite the first axial end, and a second end of the second anti-rotation arm is operably connected to the second axial end of the axial rod.

16. The vehicle of claim 15, wherein the first axial end of the axial rod is located generally adjacent to the first axial end of the piston, and wherein the second axial end of the axial rod is located generally adjacent to the second axial end of the piston.

17. The vehicle of claim 16, wherein the housing further includes a first connection hole and a second connection hole spaced apart from the first connection hole, each of the first and second connection holes being formed through an outer surface of the housing and extending into the hollow interior space of the cylinder, wherein the first connection hole extends into a first portion of first cylinder and the second connection hole extends into a second portion of the first cylinder, the first and second portions of the hollow interior space being defined by a central disk of the piston that circumferentially contacts an inner surface of the first cylinder so as to fluidically seal the first portion from the second portion, wherein a first plug closes a first axial end opening of the first cylinder adjacent the first portion and a second plug closes a second axial end opening of the first cylinder adjacent the second portion, wherein the first and second portions are at least partially filled with fluid, wherein the steering assist assembly further includes a fluidic connection component attached to the first and second connection holes, the fluidic connection component fluidically connecting the first portion to the second portion of the hollow interior space of the first cylinder, and wherein axial movement of the piston causes the fluid to flow from one of the first and second portions to the other of the first and second portions via the fluidic connection component, the flow of the fluid configured to damp vibrations caused by movement of the piston and the axial rod within the first and second cylinders and caused by movement of the vehicle.

18. The vehicle of claim 13, further comprising:
a fluid supply system operably connected to the steering control and to the steering assist assembly, the fluid supply system configured to supply and remove fluid from the hollow interior space of the first cylinder so as to partially control axial movement of the piston along with axial movement of the axial rod caused by rotation of the shaft,
wherein the fluid supply system includes a hydraulic metering valve and a pump, wherein the hydraulic metering valve is operably connected to the steering control and to the pump, and wherein the hydraulic metering valve is configured to direct fluid from the pump to a first portion of the hollow interior space of the first cylinder and configured to direct fluid away from a second portion of the hollow interior space of the first cylinder, the first and second portions of the hollow interior space being defined by a central disk of the piston that circumferentially contacts an inner surface of the first cylinder so as to fluidically seal the first portion from the second portion.

19. The vehicle of claim 18, wherein the hydraulic metering valve is configured to direct fluid from the pump to the first portion of the hollow interior space of the cylinder and configured to direct fluid away from a second portion of the hollow interior space of the cylinder in response to the steering control being in a predetermined position such that the axial movement of the piston corresponds to the axial movement of the axial rod caused by rotation of the shaft.

20. A method of controlling steering of a vehicle, comprising:
receiving a predetermined position of a steering control of the vehicle, the vehicle including a steering system including a steering assist assembly having an axially movable piston arranged in an axially extending first cylinder located within a housing of the steering assist assembly, the steering assist assembly further including an axially movable axial rod slidably arranged within an axially extending second cylinder located within the housing, the steering assist assembly further including a first tie rod connected to a first axial end of the axial rod and a second tie rod connected to a second axial end of the axial rod opposite the first axial end;
moving the axial rod based on the predetermined position of the steering wheel via rotation of a shaft operably connected to the steering control and configured to engage the axial rod so as to axially move the axial rod, the rotation of the shaft causing the axial rod to axially move and arrange the axial rod in a first axial position that corresponds to the predetermined position of the steering control, wherein axial movement of the axial rod at least partially causes the first and second tie rods to axially move; and
supplying and removing fluid to and from a hollow interior space defined within the first cylinder based on the predetermined position of the steering control via a fluid supply system operably connected to the steering control and to the steering assist assembly in order to control axial movement of the piston and arrange the piston in a first axial position that corresponds to the predetermined position of the steering control, wherein axial movement of the piston at least partially causes the first and second tie rods to axially move along with the axial movement of the axial rod,
wherein the steering system includes at least one anti-rotation arm operably connected to the piston and to the axial rod, the at least one anti-rotation feature configured to prevent rotation of the piston and the axial rod.

* * * * *